(12) United States Patent
Suka et al.

(10) Patent No.: US 12,580,113 B2
(45) Date of Patent: Mar. 17, 2026

(54) SOLENOID, DAMPING FORCE ADJUSTMENT MECHANISM, AND DAMPING FORCE ADJUSTABLE SHOCK ABSORBER

(71) Applicant: Hitachi Astemo, Ltd., Hitachinaka (JP)

(72) Inventors: Ryuichi Suka, Hitachinaka (JP); Milton Muzvidziwa, Hitachinaka (JP)

(73) Assignee: HITACHI ASTEMO, LTD., Ibaraki (JP)

( * ) Notice: Subject to any disclaimer, the term of this patent is extended or adjusted under 35 U.S.C. 154(b) by 426 days.

(21) Appl. No.: 18/025,505

(22) PCT Filed: Aug. 4, 2021

(86) PCT No.: PCT/JP2021/028935

§ 371 (c)(1),
(2) Date: Mar. 9, 2023

(87) PCT Pub. No.: WO2022/070602

PCT Pub. Date: Apr. 7, 2022

(65) Prior Publication Data

US 2023/0352226 A1 Nov. 2, 2023

(30) Foreign Application Priority Data

Sep. 30, 2020 (JP) ................................. 2020-164781

(51) Int. Cl.
| | |
|---|---|
| *H01F 7/16* | (2006.01) |
| *F16F 9/19* | (2006.01) |
| *F16F 9/46* | (2006.01) |
| *F16K 31/06* | (2006.01) |
| *B60G 13/08* | (2006.01) |
| *B60G 17/08* | (2006.01) |

(52) U.S. Cl.
CPC .............. *H01F 7/1607* (2013.01); *F16F 9/19* (2013.01); *F16F 9/461* (2013.01);
(Continued)

(58) Field of Classification Search
CPC .......... F16F 9/19; F16F 9/461; F16F 2222/12; F16F 2228/066; F16F 2230/18;
(Continued)

(56) References Cited

U.S. PATENT DOCUMENTS

| | | | |
|---|---|---|---|
| 8,965,632 B2 * | 2/2015 | Uchino ................. | B60G 17/08 701/40 |
| 9,759,284 B2 * | 9/2017 | Hagidaira ............... | F16K 31/06 |

(Continued)

FOREIGN PATENT DOCUMENTS

| | | | | |
|---|---|---|---|---|
| JP | 2013-11342 | 1/2013 | | |
| JP | 2014073018 A | * | 4/2014 | ............. H02K 33/02 |
| WO | WO-2019130682 A1 | * | 7/2019 | ............... H01F 7/16 |

OTHER PUBLICATIONS

International Search Report issued Oct. 19, 2021 in International Application No. PCT/JP2021/028935, with English translation.
(Continued)

*Primary Examiner* — Thomas W Irvin

(74) *Attorney, Agent, or Firm* — Wenderoth, Lind & Ponack, L.L.P.

(57) ABSTRACT

A housing (36) of a solenoid (33) is configured by including an accommodating tube portion (36A) extending in a winding axis direction of a coil (34A) and being open at one end. An anchor (41) is provided at such a position as to face the opening of the accommodating tube portion of the housing and includes a protruding portion (41) and a lateral face portion (41D) which are formed in an integral manner. A yoke (39) includes a fixing hole (39A). The fixing hole includes an inner peripheral face facing a part of the lateral face portion of the anchor. A cylinder (44) is joined to an inner periphery of the yoke at an outer periphery on one side in the winding axis direction of the coil and joined to an outer periphery of the housing at an inner periphery on the other side.

10 Claims, 11 Drawing Sheets

(52) U.S. Cl.
CPC .......... *F16K 31/0675* (2013.01); *B60G 13/08* (2013.01); *B60G 17/08* (2013.01); *B60G 2202/24* (2013.01); *B60G 2206/41* (2013.01); *B60G 2500/11* (2013.01); *B60G 2600/20* (2013.01); *B60G 2600/26* (2013.01); *B60G 2800/162* (2013.01); *F16F 2222/12* (2013.01); *F16F 2228/066* (2013.01); *F16F 2230/18* (2013.01)

(58) Field of Classification Search
CPC ..... F16K 31/0675; B60G 13/08; B60G 17/08; B60G 2202/24; B60G 2206/41; B60G 2500/11; B60G 2600/20; B60G 2800/162; H01F 7/1607
See application file for complete search history.

(56) References Cited

U.S. PATENT DOCUMENTS

| | | | | |
|---|---|---|---|---|
| 9,810,280 | B2 * | 11/2017 | Hagidaira | ................. F16F 9/34 |
| 11,566,680 | B2 * | 1/2023 | Kato | .......................... F16F 9/19 |
| 12,338,874 | B2 * | 6/2025 | Seto | ........................... H01F 7/16 |
| 2007/0063160 | A1 * | 3/2007 | Suzuki | ................ F16K 31/0655 251/129.21 |
| 2012/0305349 | A1 | 12/2012 | Murakami et al. | |
| 2014/0324289 | A1 * | 10/2014 | Uchino | ................... F16F 9/465 701/37 |
| 2016/0025237 | A1 * | 1/2016 | Mori | ................... F16K 31/0655 251/30.01 |
| 2017/0350528 | A1 * | 12/2017 | Fukunaga | ........... F16K 31/0675 |
| 2023/0386717 | A1 * | 11/2023 | Suka | ..................... H01F 7/1607 |
| 2024/0083208 | A1 * | 3/2024 | Shimazaki | ........... H01F 7/1607 |
| 2025/0172190 | A1 * | 5/2025 | Suka | ..................... H01F 7/1607 |
| 2025/0180137 | A1 * | 6/2025 | Muzvidziwa | ........... H01F 7/128 |

OTHER PUBLICATIONS

Written Opinion of the International Searching Authority issued Oct. 19, 2021 in International Application No. PCT/JP2021/028935, with English translation.

* cited by examiner

SOLENOID, DAMPING FORCE ADJUSTMENT MECHANISM, AND DAMPING FORCE ADJUSTABLE SHOCK ABSORBER

TECHNICAL FIELD

The disclosure relates, for example, to solenoids, damping force adjustment mechanisms, and damping force adjustable shock absorbers.

BACKGROUND ART

A vehicle, such as a four-wheel automobile, is provided with a shock absorber (damper) between a vehicle body (sprung) side and each wheel (unsprung) side. A damping force adjustable hydraulic shock absorber has been known as such a vehicle shock absorber. The damping force adjustable hydraulic shock absorber variably adjusts a damping force, for example, according to driving conditions, vehicle behavior and the like. The damping force adjustable hydraulic shock absorber configures, for example, a semi-active suspension of a vehicle.

The damping force adjustable hydraulic shock absorber is capable of variably adjusting a generated damping force by adjusting the valve-opening pressure of a damping force adjustment valve using a variable damping force actuator. For example, Patent Literature 1 discusses a shock absorber using a solenoid as a variable damping force actuator. The solenoid (solenoid block 31) of Patent Literature 1 is so configured that a housing (core 74) and a yoke (solenoid case 71) are connected together via a joining member (no reference sign provided). In this certain case, the inner diameter side (inner periphery) of one end of the joining member (no reference sign provided) is fixed to the outer diameter side (outer periphery) of the yoke (solenoid case 71), and the inner diameter side (inner periphery) of the other end of the joining member is fixed to the outer diameter side (outer periphery) of the housing (core 74).

CITATION LIST

Patent Literature

PTL 1: Japanese Unexamined Patent Application Publication (Kokai) No. 2013-11342

SUMMARY OF INVENTION

In the case of the solenoid (solenoid block 31) discussed in Patent Literature 1, if the outer diameter of a mover (plunger 75) is increased while the inner diameter of a coil (72) is restrained from being increased, it reduces thicknesses of a stator (core 73), the yoke (solenoid case 71), and the joining member (no reference sign provided) which are located between the outer diameter side of the mover (plunger 75) and the inner diameter side of the coil (72). In such a case, the corner portion (no reference sign provided) of the stator (core 73) is reduced in wall thickness, which leads to magnetic saturation and might decrease thrust force. It is therefore difficult to improve thrust characteristics of the solenoid and reduce the axial length of the solenoid.

An object of one embodiment of the invention is to provide a solenoid that can be improved in thrust characteristics and reduced in axial length, a damping force adjustment mechanism, and a damping force adjustable shock absorber.

One embodiment of the invention provides a solenoid including a coil that is wound into an annular shape and configured to generate magnetic force by being energized; an accommodating member comprising a magnetic element arranged at an inner periphery of the coil, extending in a winding axis direction of the coil, and provided with an accommodating portion with one end opened; a mover provided in the accommodating portion so as to be movable in the winding axis direction of the coil and comprising a magnetic element; a stator provided at such a position as to face an opening of the accommodating portion and so configured that a protruding portion protruding toward the opening of the accommodating portion and a lateral face portion extending from an outer periphery of the protruding portion in a direction away from the opening of the accommodating portion are integrally formed by a magnetic element; a yoke including a fixing hole with an inner peripheral surface facing a part of the lateral face portion of the stator; and a joining member configured to be joined to an inner periphery of the yoke at an outer periphery of one side in a winding axis direction of the coil and joined to an outer periphery of the accommodating member at an inner periphery of the other side, the joining member comprising a non-magnetic element.

One embodiment of the invention provides a damping force adjustment mechanism including a coil wound into an annular shape and configured to generate magnetic force by being energized; an accommodating member comprising a magnetic element arranged at the inner periphery of the coil, extending in a winding axis direction of the coil, and provided with an accommodating portion with one end opened; a mover provided in the accommodating portion so as to be movable in the winding axis direction of the coil and comprising a magnetic element; a control valve configured to be controlled by motion of the mover; a stator provided at such a position as to face an opening of the accommodating portion and so configured that a protruding portion protruding toward the opening of the accommodating portion and a lateral face portion extending from an outer periphery of the protruding portion in a direction away from the opening of the accommodating portion are integrally formed by a magnetic element; a yoke including a fixing hole with an inner peripheral surface facing a part of the lateral face portion of the stator; and a joining member configured to be joined to an inner periphery of the yoke at an outer periphery of one side in a winding axis direction of the coil and joined to an outer periphery of the accommodating member at an inner periphery of the other side, the joining member comprising a non-magnetic element.

One embodiment of the invention provides a damping force adjustable shock absorber including a cylinder in which hydraulic fluid is sealingly contained; a piston slidably provided in the cylinder; a piston rod coupled with the piston and extending out of the cylinder; and a damping force adjustment mechanism configured to control a flow of the hydraulic fluid which is generated by sliding motion of the piston within the cylinder to generate a damping force, the damping force adjustment mechanism including a coil wound into an annular shape and configured to generate magnetic force by being energized; an accommodating member comprising a magnetic element arranged at the inner periphery of the coil, extending in a winding axis direction of the coil, and provided with an accommodating portion with one end opened; a mover provided in the accommodating portion so as to be movable in the winding axis direction of the coil and comprising a magnetic element; a control valve configured to be controlled by motion of the mover; a stator provided at such a position as to face an opening of the accommodating portion and so configured that a protruding portion protruding toward the opening of the accommodating portion and a lateral face portion extending from an outer periphery of the protruding portion in a direction away from the opening of the accommodating portion are integrally formed by a magnetic element; a yoke including a fixing hole with an inner peripheral surface facing a part of the lateral face portion of the stator; and a joining member configured to be joined to an inner periphery of the yoke at an outer periphery of one side in a winding axis direction of the coil and joined to an outer periphery of the accommodating member at an inner periphery of the other side, the joining member comprising a non-magnetic element.

According to one embodiment of the invention, it is possible to improve thrust characteristics of a solenoid (a portion corresponding to the solenoid of the damping force adjustment mechanism) and reduce an axial length of the solenoid.

DESCRIPTION OF EMBODIMENT(S)

The invention is discussed below with reference to the attached drawings, taking as an example a case in which a solenoid, a damping force adjustment mechanism, and a damping force adjustable shock absorber according to an embodiment are applied to a damping force adjustable hydraulic shock absorber. The attached drawings (FIGS. 1 to 10) are prepared with the same accuracy as design drawings.

Figure 1:
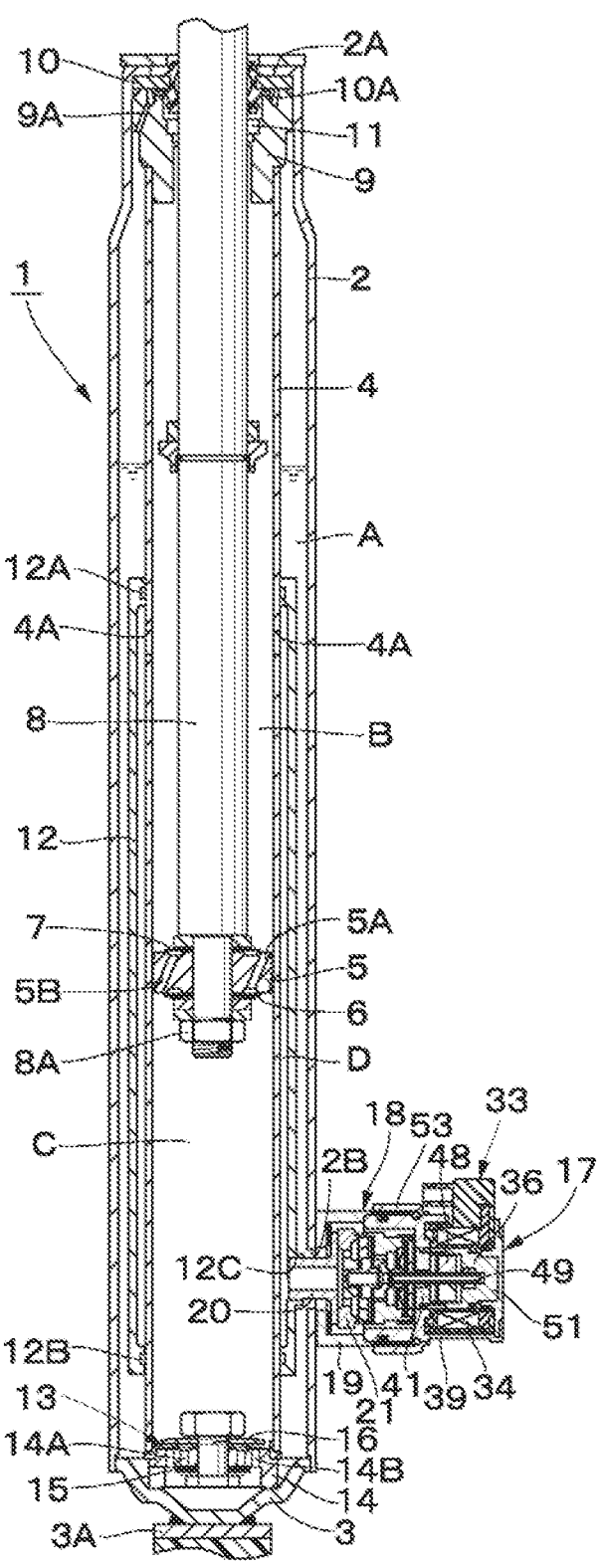
FIG. 1 is a longitudinal sectional view of a damping force adjustable shock absorber installed with a solenoid and a damping force adjustment mechanism according to an embodiment.

FIGS. 1 to 5 show the embodiment. In FIG. 1, a damping force adjustable hydraulic shock absorber 1 (hereinafter, referred to as a hydraulic shock absorber 1) includes a damping force adjustment mechanism 17 that uses a solenoid 33 as a drive source. More specifically, the hydraulic shock absorber 1 as a damping force adjustable shock absorber is configured by an outer tube 2, an inner tube 4 as a cylinder, a piston 5, a piston rod 8, a rod guide 9, and the damping force adjustment mechanism 17.

The hydraulic shock absorber 1 includes the outer tube 2 having the shape like a bottomed cylinder which forms an outer shell. The outer tube 2 is closed with a bottom cap 3 at a lower end by using welding means or the like. An upper side of the outer tube 2 is a swaged portion (staked portion or crimped portion) 2A that is bent radially inwards. The rod guide 9 and a seal member 10 are provided between the swaged portion 2A and the inner tube 4. An opening 2B is formed in a lower portion side of the outer tube 2 concentrically with a connecting port 12C of a middle cylinder 12. The damping force adjustment mechanism 17 is attached to the lower portion side of the outer tube 2 so as to face the opening 2B. The bottom cap 3 is provided with an attachment eye 3A that is attached, for example, to a wheel side of a vehicle.

The inner tube 4 is provided inside the outer tube 2 coaxially with the outer tube 2. A lower end of the inner tube 4A is attached to a bottom valve 13 in a fitted manner. An upper end of the inner tube 4 is attached to the rod guide 9 in a fitted manner. Oil liquid as hydraulic liquid (hydraulic fluid) is sealingly contained in the inner tube 4 as a cylinder. The hydraulic liquid is not limited to oil liquid or oil but may be, for example, water in which additive agent is mixed or another like fluid.

Formed between the inner tube 4 and the outer tube 2 is an annular reservoir chamber A. Gas is sealingly contained in the reservoir chamber A together with the oil liquid. The gas may be atmospheric-pressure air or a gaseous body such as a compressed nitrogen gas. The reservoir chamber A compensates the entry and exit of the piston rod 8. A fluid hole 4A is radially drilled in the inner tube 4 at an intermediate position in a length direction (axial direction) of the inner tube 4. The fluid hole 4A brings a rod-side fluid chamber B into constant communication with an annular fluid chamber D.

The piston 5 is slidably fitted inside the inner tube 4. In other words, the piston 5 is slidably provided inside the inner tube 4. The piston 5 defines (demarcates) an interior portion of the inner tube 4 into two chambers which includes the rod-side fluid chamber B and a bottom-side fluid chamber C. A plurality of fluid passages 5A and a plurality of fluid passages 5B are formed in the piston 5 away from each other in a circumferential direction. The fluid passages 5A, 5B allow the rod-side fluid chamber B and the bottom-side fluid chamber C to communicate with each other.

An extension-side disc valve 6 is provided at a lower end face of the piston 5. When pressure in the rod-side fluid chamber B exceeds a relief set pressure while the piston 5 is making an upward sliding displacement during an extension stroke of the piston rod 8, the extension-side disc valve 6 is opened to relieve the pressure to the bottom-side fluid chamber C side through each of the fluid passages 5A. The relief set pressure is set higher than valve-opening pressure in a situation where the damping force adjustment mechanism 17 is set to be hard.

A compression-side check valve 7 is provided in an upper end face of the piston 5. The check valve 7 is opened when the piston 5 makes a downward sliding displacement during a compression stroke of the piston rod 8, and closed otherwise. The check valve 7 allows the oil liquid in the bottom-side fluid chamber C to flow through each of the fluid passages 5B toward the rod-side fluid chamber B and prevents the oil liquid from flowing in the opposite direction.

Valve-opening pressure of the check valve 7 is set lower than valve-opening pressure in a situation where the damping force adjustment mechanism 17 is set to be soft, and substantially does not generate a damping force. When it is said here that the valve-opening pressure substantially does not generate a damping force, it means that the valve-opening pressure of the check valve 7 is equal to or smaller than friction of the piston 5 or the seal member 10 and therefore does not affect vehicle motion.

The piston rod 8 extends in an axial direction (vertical direction in FIG. 1) within the inner tube 4. A lower side of the piston rod 8 is inserted in the inner tube 4. The piston rod 8 is secured to the piston 5 with a nut 8A or the like. An upper side of the piston rod 8 protrudes outside the outer tube 2 and the inner tube 4 through the rod guide 9. In other words, the piston rod 8 is coupled with the piston 5 to extend outside the inner tube 4. The piston rod 8 may be configured as a so-called double rod by the lower end being further elongated and outwardly projected from a bottom portion (bottom cap 3, for example) side.

The rod guide 9 having a stepped cylinder-like shape is provided in the upper side of the inner tube 4. The rod guide 9 positions an upper portion of the inner tube 4 at the center of the outer tube 2 and guides the piston rod 8 at an inner peripheral side in an axially slidable manner. The seal member 10 having an annular shape is provided between the rod guide 9 and the swaged portion 2A of the outer tube 2. The seal member 10 is configured, for example, by baking elastic material, such as rubber, onto an annular metal disc provided with a hole at the center, through which the piston rod 8 extends. An inner periphery of the elastic material of the seal member 10 comes into sliding contact with an outer peripheral side of the piston rod 8, whereby the seal member 10 seals a space between itself and the piston rod 8.

On a lower face side of the seal member 10, a lip seal 10A is formed as a check valve extending to contact the rod guide 9. The lip seal 10A is arranged between a fluid holding chamber 11 and the reservoir chamber A. The lip seal 10A allows oil liquid or another like fluid in the fluid holding chamber 11 to flow through a return passage 9A of the rod guide 9 toward the reservoir chamber A side and prevents a reverse flow.

Arranged between the outer tube 2 and the inner tube 4 is a middle tube 12 comprising a tube element. The middle tube 12 is attached, for example, to an outer peripheral side of the inner tube 4 through upper and lower tubular seals 12A, 12B. The middle tube 12 forms an annular fluid chamber D inside. The annular fluid chamber D extends around the outer peripheral side of the inner tube 4 over the whole circumference of the inner tube 4. The annular fluid chamber D is a fluid chamber that is independent of the reservoir chamber A. The annular fluid chamber D is in constant communication with the rod-side fluid chamber B through the radial fluid hole 4A formed in the inner tube 4. The annular fluid chamber D functions as a passage in which a hydraulic liquid flow is generated by displacement of the piston rod 8. The connecting port 12C is provided at a lower side of the middle tube 12. A connecting pipe element 20 of the damping force adjustment valve 18 is attached to the connecting port 12C.

The bottom valve 13 is provided between the bottom cap 3 and the inner tube 4 to be located at the lower side of the inner tube 4. The bottom valve 13 is configured by a valve body 14 that defines (demarcates) the reservoir chamber A and the bottom-side fluid chamber C between the bottom cap 3 and the inner tube 4, a compression-side disc valve 15 provided on a lower face side of the valve body 14, and an extension-side check valve 16 provided on an upper face side of the valve body 14. Fluid passages 14A, 14B are formed in the valve body 14 at intervals in a circumferential direction. The fluid passages 14A, 14B allow the reservoir chamber A and the bottom-side fluid chamber C to communicate with each other.

When pressure in the bottom-side fluid chamber C exceeds a relief set pressure while the piston 5 is making a downward sliding displacement during the compression stroke of the piston rod 8, the compression-side disc valve 15 is opened to relieve the pressure to the reservoir chamber A side through each of the fluid passages 14A. The relief set pressure is set higher than valve-opening pressure in a situation where the damping force adjustment mechanism 17 is set to be hard.

The extension-side check valve 16 is opened when the piston 5 makes the upward sliding displacement during the extension stroke of the piston rod 8, and is closed otherwise. The check valve 16 allows the oil liquid in the reservoir chamber A to flow through each of the fluid passages 14B toward the bottom-side fluid chamber C and prevents the oil liquid from flowing in the opposite direction. Valve-opening pressure of the check valve 16 is set lower than valve-opening pressure in a situation where the damping force adjustment mechanism 17 is set to be soft, thereby substantially does not generate a damping force.

The damping force adjustment mechanism 17 for variably adjusting a generated damping force of the hydraulic shock absorber 1 is now discussed with reference to FIG. 2 as well as FIG. 1.

The damping force adjustment mechanism 17 is a mechanism configured to control the hydraulic liquid flow generated by sliding motion of the piston 5 within the cylinder (inner tube 4) to generate the damping force and variably adjust the generated damping force of the hydraulic shock absorber 1. The damping force adjustment mechanism 17 in FIG. 2 is in a state after a coil 34A of the solenoid 33 is externally energized (for example, controlled to generate a hard damping force), so that an armature 48 (actuating pin 49) moves to the left side in FIG. 2 (in a valve-closing direction where a pilot valve element 32 is seated on a valve seat portion 26E of a pilot body 26).

As illustrated in FIG. 1, the damping force adjustment mechanism 17 is so provided that a proximal end side (left-side end in FIG. 1) thereof is interposed between the reservoir chamber A and the annular fluid chamber D. and that a distal end side (right-side end in FIG. 1) thereof protrudes from the lower portion side of the outer tube 2 in a radially outward direction. The damping force adjustment mechanism 17 controls the flow of the oil liquid from the annular fluid chamber D to the reservoir chamber A by means of the damping force adjustment valve 18, to thereby generate the damping force. The damping force adjustment mechanism 17 variably adjusts the generated damping force by adjusting valve-opening pressure of the damping force adjustment valve 18 with the solenoid 33 used as a variable damping force actuator. The damping force adjustment mechanism 17 thus controls the hydraulic fluid (oil liquid) flow generated by the sliding motion of the piston 5 within the inner tube 4.

The damping force adjustment mechanism 17 is configured by including the damping force adjustment valve 18 configured to variably control the flow of the oil liquid from the annular fluid chamber D to the reservoir chamber A to generate the damping force having hard or soft characteristics, and the solenoid 33 configured to adjust a valve-opening/closing operation of the damping force adjustment valve 18. In other words, the valve-opening pressure of the damping force adjustment valve 18 is adjusted by the solenoid 33 used as a variable damping force actuator. The generated damping force is thus controlled to be varied to have hard or soft characteristics. The damping force adjustment valve 18 is a valve that is adjusted in valve-opening/closing operation by the solenoid 33. The damping force adjustment valve 18 is provided in a passage where the hydraulic liquid flow is generated by the displacement of the piston rod 8 (for example, between the annular fluid chamber D and the reservoir chamber A).

The damping force adjustment valve 18 is configured by including a substantially cylindrical valve case 19 including a proximal end side secured around the opening 2B of the outer tube 2 and a distal end side protruding from the outer tube 2 in the radially outward direction; the connecting pipe element 20 including a proximal end side fixed to the connecting port 12C of the middle tube 12 and a distal end side formed into an annular flange portion 20A and arranged inside the valve case 19 with a space between the annular flange portion 20A and the valve case 19; and a valve member 21 that is in contact with the flange portion 20A of the connecting pipe element 20.

Figure 2:
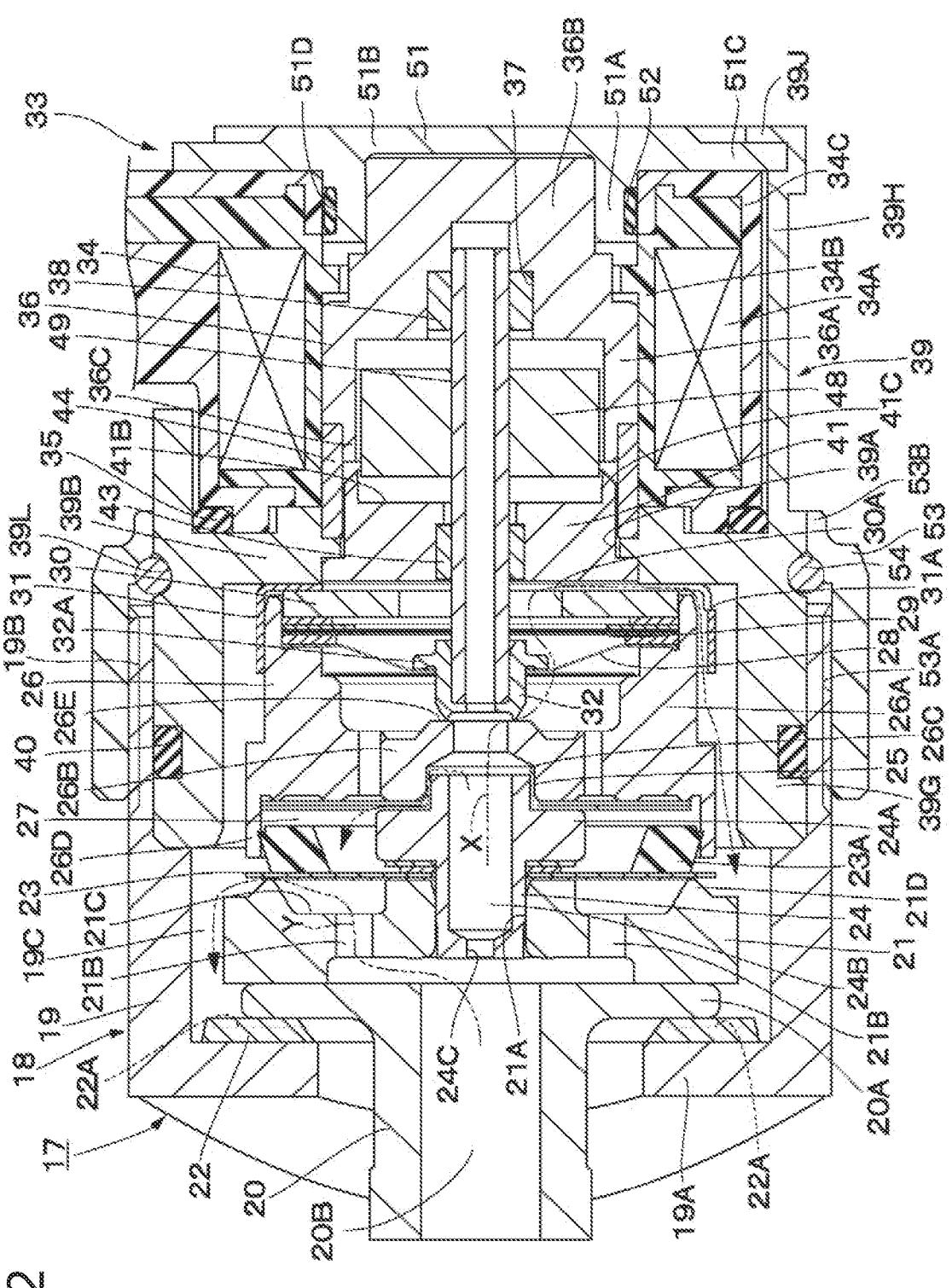
FIG. 2 is an enlarged sectional view that focuses on a damping force adjustment valve and the solenoid in FIG. 1.

As illustrated in FIG. 2, the proximal end side of the valve case 19 is formed into an annular inner flange portion 19A extending radially inwards. The distal end side of the valve case 19 is formed into an external thread portion 19B onto which a lock nut 53 is screwed. The lock nut 53 couples the valve case 19 with a yoke 39 (one side tube portion 39G) of the solenoid 33. A space between an inner peripheral surface of the valve case 19 and an outer peripheral surface of the valve member 21 and a space between the inner peripheral surface of the valve case 19 and an outer peripheral surface of the pilot body 26 and the like make up an annular fluid chamber 19C that is in constant communication with the reservoir chamber A. The valve case 19 and the solenoid 33 may be coupled together with the lock nut 53 or may be so configured, for example, that the distal end side of the valve case is swaged (staked or crimped) onto the yoke of the solenoid (instead of using a lock nut).

Inside the connecting pipe element 20 is a fluid passage 20B, one side of which is in communication with the annular fluid chamber D, and the other side of which extends as far as the valve member 21. A circular ring-shaped spacer 22 is provided between the flange portion 20A of the connecting pipe element 20 and the inner flange portion 19A of the valve case 19 in a state being held therebetween. The spacer 22 is provided with a plurality of notches 22A extending in a radial manner. The notches 22A functions as radial fluid passages for bringing the fluid chamber 19C and the reservoir chamber A into communication with each other. Although the present embodiment provides the notches 22A for forming fluid passages in the spacer 22, the notches for forming fluid passages may be radially provided in the inner flange portion 19A of the valve case 19, instead of the spacer 22. Such a configuration makes it possible to omit the spacer 22 and therefore reduce the number of components.

The valve member 21 is provided with a center hole 21A located at the radial center and extending in an axial direction. The valve member 21 is further provided with a plurality of fluid passages 21B around the center hole 21A to be spaced apart in a circumferential direction. Each of the fluid passages 21B is in constant communication with the fluid passage 20B side of the connecting pipe element 20 on one side (left side in FIGS. 1 and 2). An annular concave portion 21C and an annular valve seat 21D are provided in an end face of the other side (right side in FIGS. 1 and 2) of the valve member 21. The annular concave portion 21C is formed around the other-side opening of the fluid passage 21B. The annular valve seat 21D is located radially outside the annular concave portion 21C. A main valve 23 is seated on and unseated from the annular valve seat 21D. Each of the fluid passages 21 of the valve member 21 functions as a passage, through which pressure fluid of a flow rate according to opening degree of the main valve 23 flows, between the fluid passage 20B of the connecting pipe element 20 which is in communication with the annular fluid chamber D and the fluid chamber 19C of the valve case 19 which is in communication with the reservoir chamber A.

The main valve 23 is configured by a disc valve, an inner region of which is held between the valve member 21 and a large diameter portion 24A of a pilot pin 24. The main valve 23 is seated on and unseated from the annular valve seat 21D of the valve member 21 at an outer peripheral side. An elastic seal member 23A is secured to an outer peripheral portion of a rear surface of the main valve 23 by baking or other like means. The main valve 23 is opened when unseated from the annular valve seat 21D by receiving pressure of the fluid passage 21B side (annular fluid chamber D side) of the valve member 21. The fluid passage 21B (annular fluid chamber D side) of the valve member 21 thus comes into communication with the fluid chamber 19C (reservoir chamber A side) through the main valve 23. Amount (flow rate) of pressure fluid flowing in a direction of arrow Y at the time of the communication is variably adjusted according to opening degree of the main valve 23.

The pilot pin 24 is formed into a stepped cylinder-like shape and provided with the annular large diameter portion 24A in an axially middle portion. The pilot pin 24 includes a center hole 24B at an inner peripheral side. The center hole 24B extends in the axial direction. A small diameter hole (orifice 24C) is formed in one end portion (end portion on the connecting pipe element 20 side) of the center hole 24B. One side (left-side end in FIGS. 1 and 2) of the pilot pin 24 is press-fitted into the center hole 21A of the valve member 21, whereby the main valve 23 is held between the large diameter portion 24A and the valve member 21.

The other side (right-side end in FIGS. 1 and 2) of the pilot pin 24 is fitted in a center hole 26C of the pilot body 26. In this state, a fluid passage 25 extending in the axial direction is formed between the center hole 26C of the pilot body 26 and the other side of the pilot pin 24. The fluid passage 25 is in communication with a back pressure chamber 27 that is formed between the main valve 23 and the pilot body 26. In other words, a plurality of axially extending fluid passages 25 are circumferentially provided in a lateral face on the other side of the pilot pin 24. Other circumferential regions are press-fitted in the center hole 26C of the pilot body 26.

The pilot body 26 is formed into a substantially bottomed cylinder-like element and includes a cylindrical portion 26A with a stepped hole formed in an inner side and a bottom portion 26B closing the cylindrical portion 26A. The bottom portion 26B of the pilot body 26 is provided with the center hole 26C in which the other side of the pilot pin 24 is fitted. A protruding tube portion 26D is integrally provided on one side (left-side end in FIGS. 1 and 2) of the bottom portion 26B of the pilot body 26 over the whole circumference on an outer diameter side of the bottom portion 26B. The protruding tube portion 26D protrudes toward the valve member 21 side. The elastic seal member 23A of the main valve 23 is fitted in an inner peripheral surface of the protruding tube portion 26D in a liquid tight manner, to thereby form the back pressure chamber 27 between the main valve 23 and the pilot body 26. The back pressure chamber 27 generates pressure (inner pressure, pilot pressure) that presses the main valve 23 in a valve-closing direction, that is, in a direction that the main valve 23 is seated on the annular valve seat 21D of the valve member 21.

A valve seat portion 26E is provided on the other side (right-side end in FIGS. 1 and 2) of the bottom portion 26B of the pilot body 26 so as to surround the center hole 26C. The pilot valve element 32 is seated on and unseated from the valve seat portion 26E. Arranged inside the cylindrical portion 26A of the pilot body 26 are a return spring 28 configured to bias the pilot valve element 32 in a direction away from the valve seat portion 26E of the pilot body 26, a disc valve 29 configuring a fail-safe valve in a situation where the solenoid 33 is not being energized (when the pilot valve element 32 is farthest from the valve seat portion 26E), a holding plate 30 in which a fluid passage 30A is formed at the center, and other like elements.

A cap 31 is fixed to an open end of the cylindrical portion 26A of the pilot body 26 in a fitted manner with the return spring 28, the disc valve 29, the holding plate 30 and the like arranged inside the cylindrical portion 26A. Four notches 31A are formed in the cap 31 at intervals, for example, in a circumferential direction. As shown by arrow X in FIG. 2, the notches 31A function as flow paths that allow the oil liquid sent to the solenoid 33 side through the fluid passage 30A of the holding plate 30 to flow into the fluid chamber 19C (reservoir chamber A side).

The pilot valve element 32 configures a pilot valve (control valve) in conjunction with the pilot body 26. The pilot valve element 32 is formed into a stepped cylinder-like shape. A distal end portion of the pilot valve element 32, that is, the distal end portion seated on and unseated from the valve seat portion 26E of the pilot body 26 has a tapered shape which becomes gradually thinner. The actuating pin 49 of the solenoid 33 is fixed inside the pilot valve element 32 in a fitted manner. Valve-opening pressure of the pilot valve element 32 is adjusted according to current applied to the solenoid 33. The pilot valve (pilot body 26 and pilot valve element 32) as a control valve is thus controlled by the shifting of the actuating pin 49 (namely, armature 48) of the solenoid 33. A flange portion 32A is formed at a proximal end side of the pilot valve element 32 over the whole circumference. The flange portion 32A functions as a spring bearing. The flange portion 32A configures a fail-safe valve by coming into abutment against an inner peripheral portion of the disc valve 29 while the solenoid 33 is not being energized, that is, when the pilot valve element 32 is displaced to a fully open position at which the pilot valve element 32 is farthest from the valve seat portion 26E.

Figure 3:
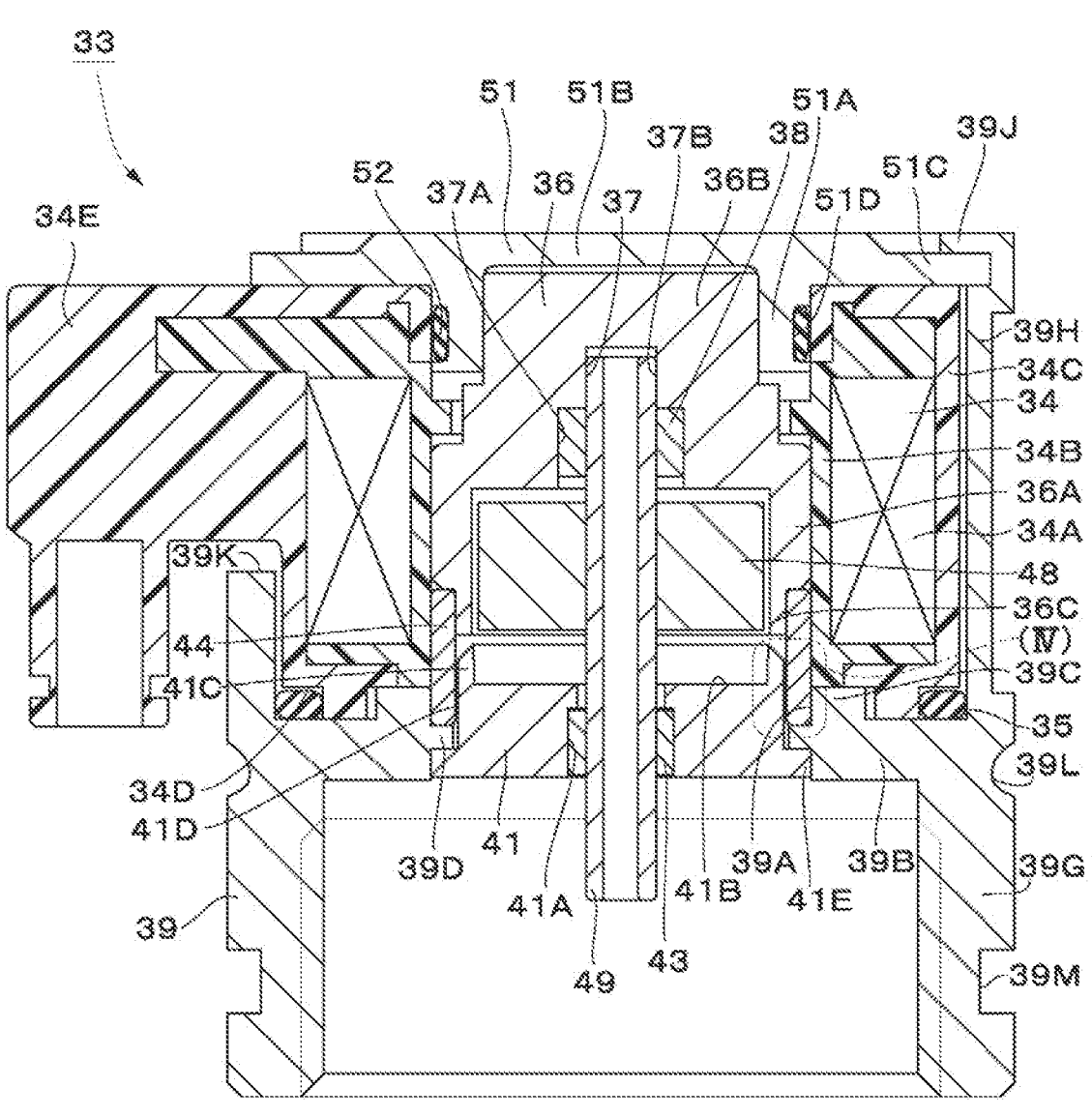
FIG. 3 is an enlarged sectional view showing the solenoid in FIG. 1.
Figure 4:
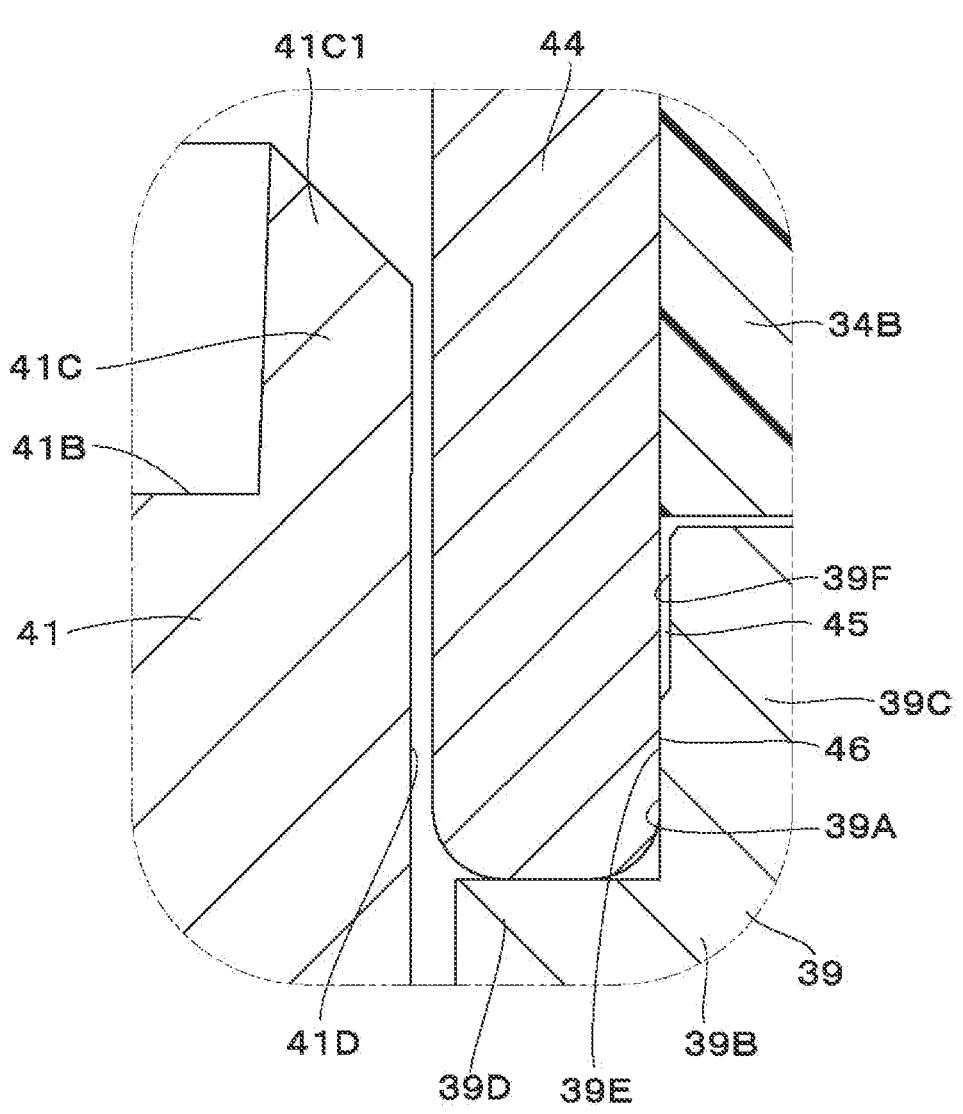
FIG. 4 is an enlarged sectional view of a (IV) region in FIG. 3.
Figure 5:
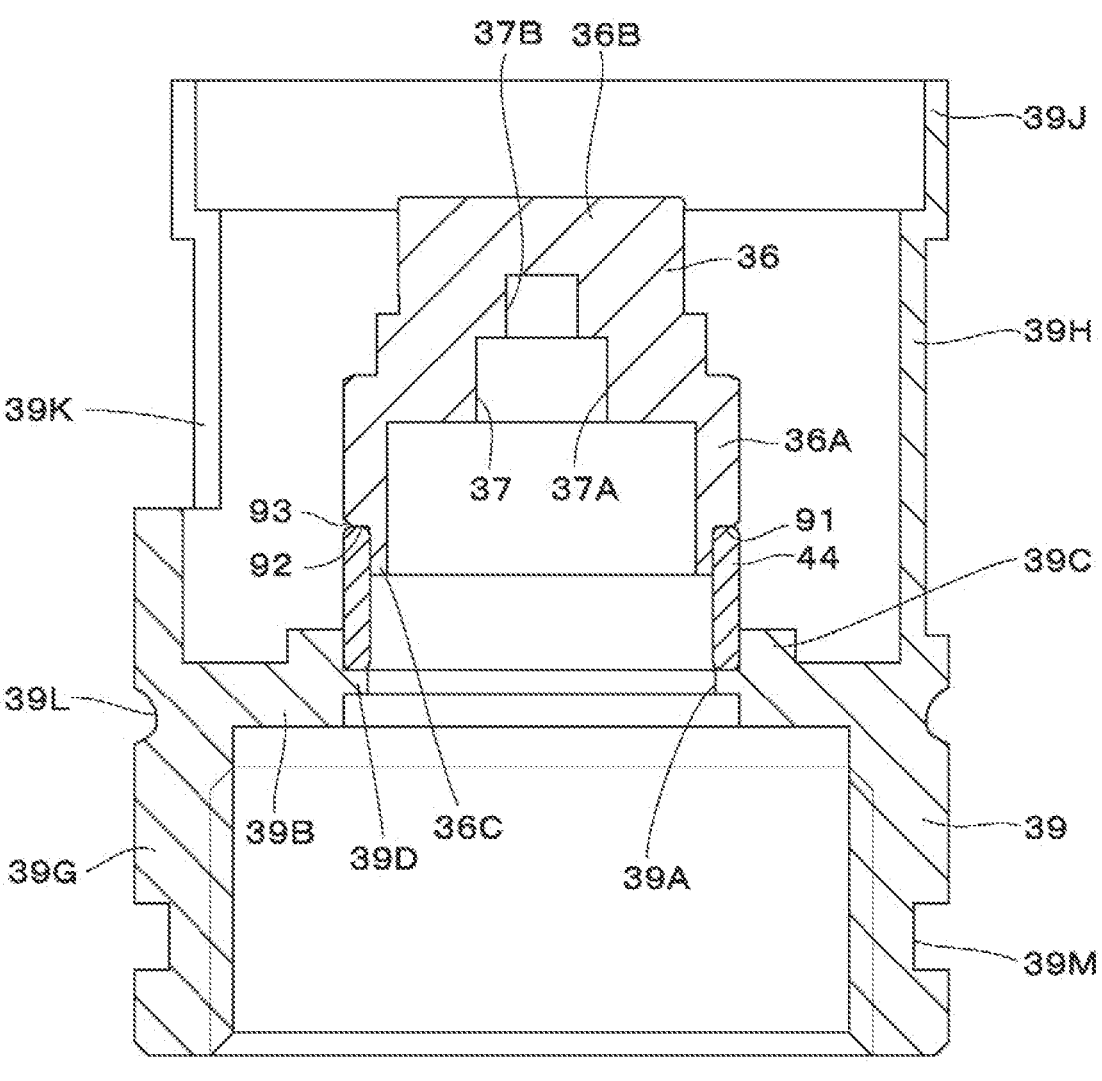
FIG. 5 is a sectional view of an accommodating member (housing), a joining member (cylinder), and a yoke in an assembled state.
Figure 6:
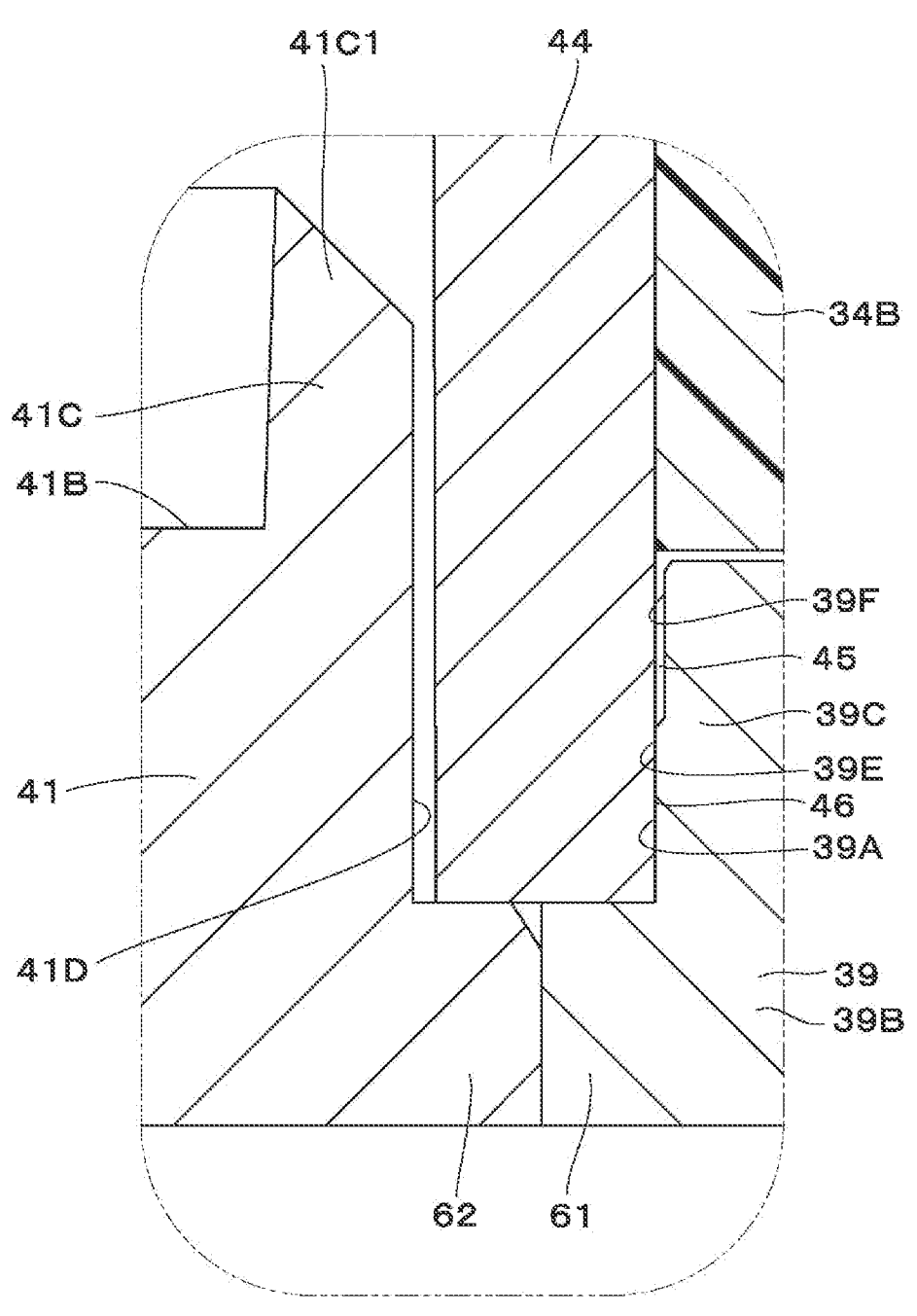
FIG. 6 is a sectional view of substantially the same region as FIG. 4 which shows a stator (anchor), a joining member, a yoke and other elements according to a first modification example.
Figure 7:
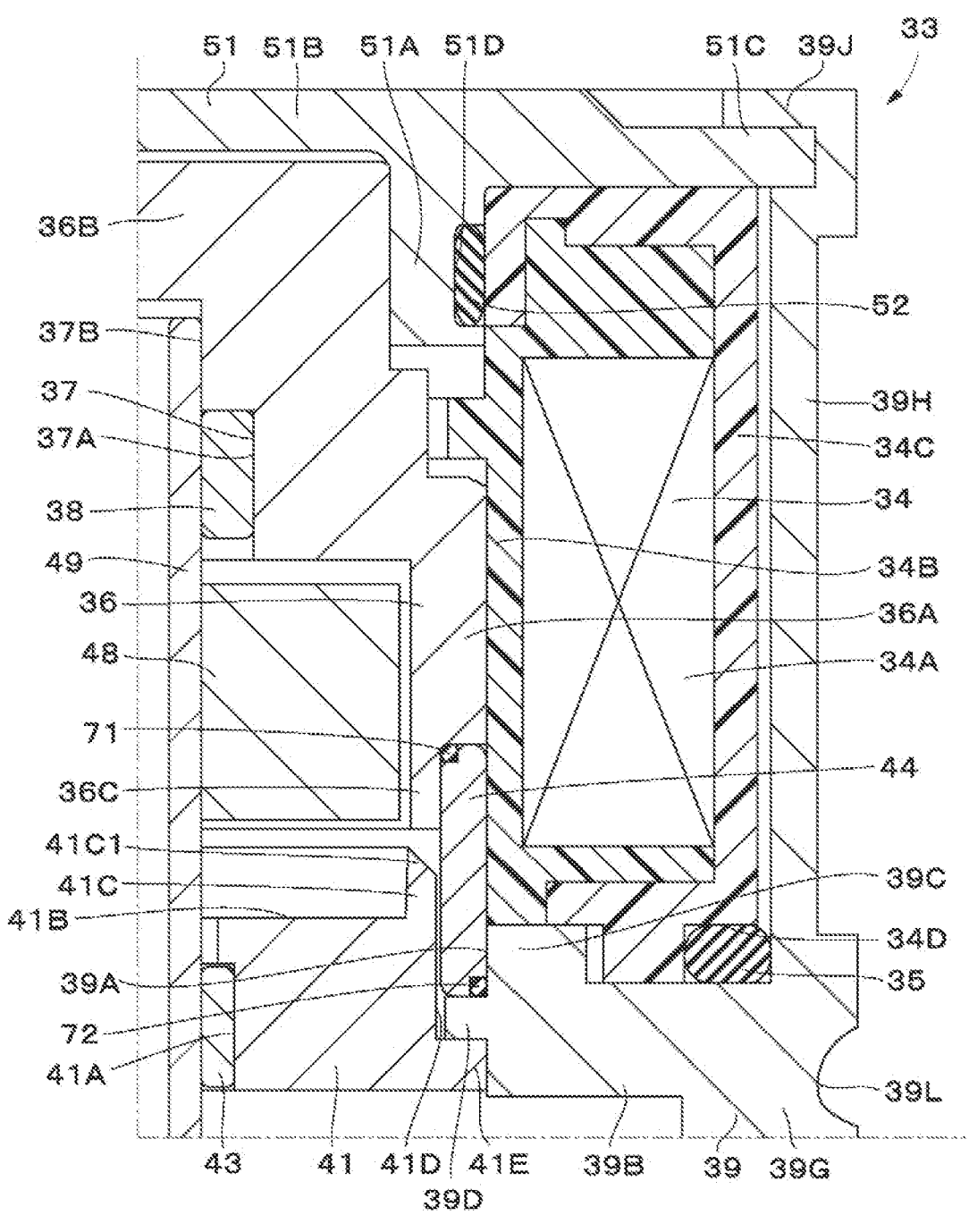
FIG. 7 is a half sectional view of a solenoid according to a second modification example.

The following discussion explains the solenoid 33 configuring the damping force adjustment mechanism 17 in conjunction with the damping force adjustment valve 18 with reference with FIGS. 3 to 5 as well as FIGS. 1 and 2. FIG. 3 shows the solenoid 33 with the right side of FIG. 2 turned to the upper side and provided with reference signs. Accordingly, the horizontal direction in FIGS. 1 and 2 corresponds to the vertical direction in FIGS. 3 to 5.

The solenoid 33 is installed in the damping force adjustment mechanism 17 as a variable damping force actuator of the damping force adjustment mechanism 17. In other words, the solenoid 33 is used in a damping force adjustable shock absorber to adjust the valve-opening/closing operation of the damping force adjustment valve 18. The solenoid 33 includes a mold coil 34, a housing 36 as an accommodating member, the yoke 39, an anchor 41 as a stator, a cylinder 44 as a joining member (non-magnetic ring), the armature 48 as a mover (movable iron core), the actuating pin 49, and a cover member 51.

One possible way to improve the thrust characteristics of a solenoid and reduce the axial length of the solenoid is to increase the diameter of an armature (mover). However, if the inner diameter of a coil is accordingly increased, the coil is increased in winding length, which increases a resistance value of the coil. It is then preferable to restrain the increase of the inner diameter of the coil, and yet increase the outer diameter of the armature.

In the solenoid (solenoid block 31) of Patent Literature 1 mentioned above, the housing (core 74) and the yoke (solenoid case 71) are connected together through the joining member (no reference sign provided). In such a case, the inner diameter side (inner periphery) of one end of the joining member (no reference sign provided) is fixed to the outer diameter side (outer periphery) of the yoke (solenoid case 71), and the inner diameter side (inner periphery) of the other end of the joining member is fixed to the outer diameter side (outer periphery) of the housing (core 74). In such a case, it seems that, in order to form a pressure container using the housing (core 74), the joining member (no reference sign provided), and the yoke (solenoid case 71), the inner diameter side of one end of the joining member (no reference sign provided) is fixed to the outer diameter side of the yoke (solenoid case 71) by press-fitting, and the inner diameter side of the other end of the joining member is fixed to the outer diameter side of the housing (core 74) by press-fitting, and that the fixed portions are joined by brazing.

In the case of the solenoid (solenoid block 31) as disclosed in Patent Literature 1, if the outer diameter of the mover (plunger 75) is increased while the inner diameter of the coil (72) is restrained from being increased, it reduces thicknesses of the stator (core 73), the yoke (solenoid case 71), and the joining member (no reference sign provided) which are located between the outer diameter side of the mover (plunger 75) and the inner diameter side of the coil (72). This reduces a corner portion (no reference sign provided) of the stator (core 73) in wall thickness, which leads to magnetic saturation and might decrease thrust force.

Another possible way is, for example, to configure a portion of the joining member which is fitted in the yoke into a large diameter portion (flared portion) having a larger radial dimension (inner diameter dimension) than other portions and place the stator and the yoke inside the large diameter portion, to thereby secure the wall thickness of the stator and of the joining member. On the other hand, this makes the joining member complicated in shape, which might increase material and processing costs. There is also a possibility that, if the large diameter portion is provided, the coil is located closer to the housing, which might increase the axial length. According to conventional art, it is difficult for the foregoing reasons to improve the thrust characteristics of the solenoid and reduce the axial length of the solenoid.

According to the present embodiment, therefore, the cylinder 44 has a cylindrical shape. Also, braze joining is applied after the press-fitting fixation (assembly) between the outer periphery (outer diameter side) of one side (yoke 39 side) of the cylinder 44 and the inner periphery (inner diameter side) of the yoke 39 (tubular projecting portion 39C) and between the inner periphery (inner diameter side) on the other side (housing 36 side) of the cylinder 44 and the outer periphery (outer diameter side) of the housing 36 (small diameter tube portion 36C). In this case, the cylinder 44 is made, for example, of stainless steel, and the housing 36 and the yoke 39 are made, for example, of mechanical structural carbon steel (S10C). When the cylinder 44 and the housing 36 are heated (raised in temperature) along with brazing, the cylinder 44 is liable to expand more than the housing 36 (small diameter tube portion 36C) due to differences in material characteristics. At this time, solder (copper ring, for example) enters the inner periphery of the cylinder 44 and the outer periphery of the housing 36 (small diameter tube portion 36C).

When the cylinder 44 and the yoke 39 are heated along with brazing, the cylinder 44 is liable to expand more than the yoke 39 (tubular projecting portion 39C) due to differences in material characteristics. A press-fitting portion 46 used for assembly of the cylinder 44 and the yoke 39 and a non-contact portion 45 that is a space portion used for braze joining are previously provided between the cylinder 44 and the yoke 39 (tubular projecting portion 39C) (see FIG. 4) so that solder (copper ring, for example) may be poured between the cylinder 44 and the yoke 39. The following discussion explains the solenoid 33 of the present embodiment which is provided with the cylinder 44 thus configured with reference to FIGS. 2 to 5.

As discussed above, the solenoid 33 includes the mold coil 34, the housing 36, the yoke 39, the anchor 41, the cylinder 44, the armature 48, and the actuating pin 49. The mold coil 34 is formed into a substantially cylindrical shape by covering (mold-forming) the coil 34A and a coil bobbin 34B in an integral manner with a resin member 34C, such as thermosetting resin, in a state where the coil 34A is wound around the coil bobbin 34B. Provided in a part of the mold coil 34 in a circumferential direction is a cable draw-out portion 34E protruding axially or radially outwards. The cable draw-out portion 34E is connected with an electric wire cable, not shown. The coil 34A of the mold coil 34 is wound around the coil bobbin 34B in an annular form and functions as an electromagnet to generate magnetic force by external electric power supply (energization) through the cable.

A seal groove 34D is formed over the whole circumference in a lateral face (one axial end face) of the resin member 34C of the mold coil 34, which faces the yoke 39 (annular portion 39B). Placed inside the seal groove 34D is a seal member (O-ring 35, for example). The O-ring 35 liquid-tightly seals a space between the mold coil 34 and the yoke 39 (annular portion 39B). This prevents dust containing rain water or mud water from entering the tubular projecting portion 39C side of the yoke 39 through the space between the yoke 39 and the mold coil 34.

The coil employed in the present embodiment is not limited to the mold coil 34 comprising the coil 34A, the coil bobbin 34B, and the resin member 34C but may be another coil. For example, the coil may be so configured that the outer periphery thereof is covered with an overmold, not shown, which is produced by molding a resin material over (from an outer peripheral side of) the coil with the coil wound around a coil bobbin made of electric insulating material.

The housing 36 configures a first fixed iron core (accommodating member) that is provided at an inner peripheral side of the mold coil 34 (that is, at an inner periphery of the coil 34A). The housing 36 is formed as a tube element in the shape of a cylinder with a lid, which is made of magnetic material (magnetic element), such as low-carbon steel and mechanical structural carbon steel (S10C). The housing 36 is configured by an accommodating tube portion 36A as an accommodating portion that extends in a winding axis direction of the mold coil 34 (coil 34A) and is open on one side (the left-side end in FIG. 2, the lower side in FIG. 3 to 5), a stepped lid portion 36B closing the other side (the right side in FIG. 2, the upper side in FIGS. 3 to 5) of the accommodating tube portion 36A, and a small diameter tube portion 36C for joining which is formed at an opening side (one side) of the accommodating tube portion 36A so as to reduce the outer periphery of the opening in diameter.

The inner periphery of the cylinder 44 is joined to the outer periphery of the small diameter tube portion 36C of the housing 36 by brazing. The accommodating tube portion 36A of the housing 36 is so formed that an inner diameter dimension thereof is slightly larger than outer diameter dimension of the armature 48. The armature 48 is accommodated in the accommodating tube portion 36A in an axially movable manner.

The lid portion 36B of the housing 36 is formed integrally with the accommodating tube portion 36A as a tube element with a lid which closes the accommodating tube portion 36A from the other axial side. The lid portion 36B has a stepped shape that is smaller in outer diameter than the accommodating tube portion 36A. A fitted tube portion 51A of the cover member 51 is fitted onto an outer periphery of the lid portion 36B. A bottomed, stepped hole 37 is formed in the housing 36 to be located at an inner side of the lid portion 36B. The stepped hole 37 comprises a bush attachment hole portion 37A and a small diameter hole portion 37B that is formed to have small diameter on a further rear side than the bush attachment hole portion 37A. Provided inside the bush attachment hole portion 37A is a first bush 38 for supporting the actuating pin 49 in a slidable manner.

The other side end face of the lid portion 36B of the housing 36 is arranged to face a lid plate 51B of the cover member 51 with an axial space therebetween. The axial space has a function of preventing an axial force from being applied directly onto the housing 36 from the lid plate 51B side of the cover member 51 through the lid portion 36B. The lid portion 36B of the housing 36 does not necessarily have to be integrally formed of the same material (magnetic element) as the accommodating tube portion 36A. The lid portion 36B in the present case may be formed, for example, of a rigid metal material, ceramic material or fiber reinforced resin material, instead of magnetic material. A join between the accommodating tube portion 36A and the lid portion 36B of the housing 36 is positioned in consideration of transmission of magnetic flux.

The yoke 39 is a magnetic member that forms, in conjunction with the housing 36, a magnetic circuit (magnetic path) over the inner and outer peripheries of the mold coil 34 (coil 34A). The yoke 39, like the housing 36, is formed using magnetic material (magnetic element). The yoke 39 is configured by including the annular portion 39B radially extending at one axial side (one side in the winding axis direction) of the mold coil 34 (coil 34A) and formed into a stepped fixing hole 39A on an inner peripheral side, and the tubular projecting portion 39C protruding from the inner peripheral side of the annular portion 39B toward the other axial side (coil 34A side) of the mold coil 34 to have a tubular shape along the axial direction of the fixing hole 39A. The tubular projecting portion 39C configures a joining projection (tube portion) to be joined to the cylinder 44. The cylinder 44 is inserted in the inner diameter side of the tubular projecting portion 39C.

In other words, the yoke 39 includes the fixing hole 39A, and an inner peripheral surface of the fixing hole 39A faces a part of a lateral face portion 41D of the anchor 41. Provided inside the fixing hole 39A over the whole circumference is a flanged portion 39D protruding toward an inner diameter side. One axial side end face (one end face) of the cylinder 44 abuts against a lateral surface (lateral surface at the coil 34A side) of the inwardly flanged portion 39D. The outer periphery of the one axial side of the cylinder 44 is fitted to the inner periphery of the yoke 39, namely, an inner face of the fixing hole 39A (that is, the inner peripheral surface of the tubular projecting portion 39C).

As illustrated in FIG. 4, the fixing hole 39A (the inner diameter side of the tubular projecting portion 39C) of the yoke 39 includes, in the order from the one axial side (inwardly flanged portion 39D side), a small diameter hole portion 39E having a small inner diameter dimension and a large diameter hole portion 39F having a larger inner diameter dimension than the small diameter hole portion 39E. Accordingly, a non-contact portion 45 is formed between the cylinder 44 and the yoke 39 at the housing 36 side in the winding axis direction of the coil 34A, that is, the other axial side. The non-contact portion 45 is where the outer periphery of the cylinder 44 and the inner periphery of the yoke 39 (the inner face of the fixing hole portion 39A, the inner peripheral surface of the tubular projecting portion 39C) do not contact each other. In the cylinder 44 and the yoke 39, the press-fitting portion 46 is also formed at the opposite side from the housing 36 side in the winding axis direction of the coil 34A, that is, the one axial side. The press-fitting portion 46 is where the outer periphery of the cylinder 44 and the inner periphery of the yoke 39 (the inner face of the fixing hole portion 39A, the inner peripheral surface of the tubular projecting portion 39C) are press-fitted. The non-contact portion 45 is so designed as to secure a space into which solder enters, for example, when the cylinder 44 and the yoke 39 are raised in temperature along with brazing.

The yoke 39 is formed as an integral object including an one side tube portion 39G in a cylindrical shape, which extends from an outer peripheral side of the annular portion 39B toward the one axial side (toward the damping force adjustment valve 18 side), the other side tube portion 39H extending from the outer peripheral side of the annular portion 39B toward the other axial side (toward the cover member 51 side) and formed so as to surround the mold coil 34 from the radially outside, and a swaged portion (staked portion or crimped portion) 39J provided at a distal end side of the other side tube portion 39H to hold a flanged portion 51C of the cover member 51 in a non-slip state. Provided in the other side tube portion 39H of the yoke 39 is a notch 39K for exposing the cable draw-out portion 34E of the mold coil 34 outside the other side tube portion 39H.

An engaging concave portion 39L is provided between the one side tube portion 39G and the other side tube portion 39H of the yoke 39 (over the whole circumference or at a plurality of places at circumferential intervals). The engaging concave portion 39L is formed into a semicircular shape in section so as to open in an outer peripheral surface of the yoke 39. The lock nut 53 screwed into the valve case 19 of the damping force adjustment valve 18 is engaged with the engaging concave portion 39L with a non-slip ring 54 (see FIG. 2) intervening therebetween. A seal groove 39M is provided in an outer peripheral surface of the one side tube portion 39G over the whole circumference. An O-ring 40 (see FIG. 2) as a seal member is placed in the seal groove 39M. The O-ring 40 seals a space between the yoke 39 (one side tube portion 39G) and the valve case 19 of the damping force adjustment valve 18 in a liquid tight manner.

The anchor 41 is a second fixed iron core (stator) that is fixed inside the fixing hole 39A of the yoke 39 by means such as press-fitting. Like the housing 36 (first fixed iron core) and the yoke 39, the anchor 41 is formed of magnetic material (magnetic element), such as low-carbon steel and mechanical structural carbon steel (SI OC), to have such a shape as to fill the fixing hole 39A of the yoke 39 from inside. The anchor 41 is formed as an annular element having a short cylinder-like shape, a central region of which is a through-hole 41A extending in the axial direction. One axial side face (a face that axially faces the cap 31 of the damping force adjustment valve 18 illustrated in FIG. 2) of the anchor 41 is formed into a flat face as well as one side face of the annular portion 39B of the yoke 39.

A circular concave indent portion 41B is provided in the form of a recess at the other axial side (the other side face that axially faces the armature 48) of the anchor 41 so as to be coaxial with the accommodating tube portion 36A. The concave indent portion 41B is formed as a circular groove having a slightly larger diameter than the armature 48 to allow the armature 48 to be inserted therein in such a manner that the armature 48 may come into and out of the concave indent portion 41B by magnetic force. Accordingly, a cylindrical protruding portion 41C is provided on the other side of the anchor 41. An outer peripheral surface on an open side of the protruding portion 41C is formed into a circular cone-shaped surface so that magnetic characteristics are linear (straight) between the anchor 41 and the armature 48.

In other words, the protruding portion 41C that is also called a corner portion protrudes from an outer peripheral side of the anchor 41 toward the other axial side to have a cylindrical shape. The outer peripheral surface (outer peripheral surface at the open side) of the protruding portion 41C is a conical surface inclined into a tapered shape so that an outer diameter dimension of the outer peripheral surface is gradually reduced toward the other axial side (open side). More specifically, the protruding portion 41C of the anchor 41 includes a reduced diameter portion 41C1 that is provided in such a position as to face an opening of the housing 36 (accommodating tube portion 36A). An outer diameter of the reduced diameter portion 41C1 is gradually reduced toward the opening of the accommodating tube portion 36A.

The lateral face portion 41D is formed on the outer periphery of the anchor 41. The lateral face portion 41D extends along the outer periphery of the protruding portion 41C in a direction away from the opening of the accommodating tube portion 36A of the housing 36. An end portion of the lateral face portion 41D which is located on a side away from the opening is an annular flange portion 41E protruding radially outwards. The annular flange portion 41E is arranged at a position far away from an open end of the accommodating tube portion 36A of the housing 36 toward one axial side (that is, arranged in an opposite end portion to the concave indent portion 41B).

The annular flange portion 41E is fixed, for example, inside the fixing hole 39A of the yoke 39 by means such as press-fitting. The annular flange portion 41E is a fixed portion of the anchor 41 (lateral face portion 41D) with respect to the fixing hole 39A of the yoke 39, and also is a portion facing the fixing hole 39A in the radial direction. The lateral face portion 41D (except the annular flange portion 41E) of the anchor 41 faces an inner peripheral surface of the cylinder 44 and an inner face of the inwardly flanged portion 39D of the yoke 39 with a space (radial space) between the lateral face portion 41D on one hand and the inner peripheral surface of the cylinder 44 and the inner face of the inwardly flanged portion 39D on the other.

In any case, the anchor 41 comprises the protruding portion 41C and the lateral face portion 41D which are integrally formed by a magnetic element. The anchor 41 is provided in such a position as to face the opening of the accommodating tube portion 36A of the housing 36. The protruding portion 41C protrudes toward the opening of the accommodating tube portion 36A of the housing 36. The lateral face portion 41D extends from the outer periphery of the protruding portion 41C in a direction away from the opening of the accommodating tube portion 36A of the housing 36. The lateral face portion 41D is so arranged that there is a space between the lateral face portion 41D on one hand and the inner peripheral surface of the cylinder 44 and the inner face of the inwardly flanged portion 39D of the yoke 39 on the other.

As illustrated in FIG. 3, a second bush 43 for slidably supporting the actuating pin 49 is fitted in the stepped through-hole 41A that is formed at the center (inner periph- eral) side of the anchor 41. As illustrated in FIG. 2, the pilot body 26, the return spring 28, the disc valve 29, the holding plate 30, the cap 31 and the other elements of the damping force adjustment valve 18 are inserted in an inner peripheral side of the one side tube portion 39G of the yoke 39. The valve case 19 of the damping force adjustment valve 18 is fitted to (fitted over) an outer peripheral side of the one side tube portion 39G.

The cylinder 44 is provided between the yoke 39 and the anchor 41 with respect to the radial direction. The cylinder 44 is provided between the yoke 39 and the housing 36 with respect to the axial and radial directions. More specifically, the cylinder 44 is a non-magnetic joint member (joining member) that is provided at the inner peripheral side of the mold coil 34 (coil 34A) to be located between the small diameter tube portion 36C of the housing 36 and the tubular projecting portion 39C of the yoke 39. The cylinder 44 comprises a non-magnetic element. To be more specific, the cylinder 44 is formed into a cylindrical element (mere cylindrical element) using non-magnetic material, such as austenitic stainless steel.

The outer periphery of the cylinder 44 on one side (yoke 39 side) in the winding axis direction of the mold coil 34 (coil 34A) is joined to the inner periphery of the yoke 39 (fixing hole 39A, tubular projecting portion 39C). The inner periphery of the cylinder 44 on the other side (housing 36 side) in the winding axis direction of the mold coil 34 (coil 34A) is joined to the outer periphery of the housing 36 (small diameter tube portion 36C). In other words, the cylinder 44 is fitted (press-fitted) onto the outside (outer peripheral side) of the small diameter tube portion 36C of the housing 36. The cylinder 44 and the small diameter tube portion 36C are joined together by brazing. The cylinder 44 is fitted (press-fitted) into the inside (inner peripheral side) of the tubular projecting portion 39C of the yoke 39. The cylinder 44 and the tubular projecting portion 39C are joined together by brazing. In such a case, the braze joining is carried out, for example, after the cylinder 44, the housing 36, and the yoke 39 are assembled together by press-fitting the cylinder 44 and the housing 36 and press-fitting the cylinder 44 and the yoke 39.

As described above, according to the present embodi- ment, the cylinder 44 is joined to the housing 36 and the yoke 39 with solder. The solder may be, for example, pure copper solder. That is, brazing can be carried out using solder (copper ring) containing pure copper solder through brazing processing, for example, at a temperature of 1000° C. or higher. The solder does not necessarily have to be pure copper solder and may be, for example, brass solder, nickel solder, gold solder, palladium solder or another solder. In any case, the cylinder 44 is joined to the small diameter tube portion 36C of the housing 36 and the tubular projecting portion 39C of the yoke 39 by brazing. After the brazing processing, rapid cooling processing is carried out. At this point, the inner diameter of the cylinder 44 is formed larger than an outer diameter of the lateral face portion 41D of the anchor 41.

The cylinder 44 is formed of material having a different linear expansion coefficient from material of which the yoke 39 and the housing 36 are formed. For example, the cylinder 44 is made of stainless steel, and the housing 36 is made of mechanical structural carbon steel (S10C). In such a case, when the cylinder 44 and the housing 36 are raised in temperature along with brazing, the cylinder 44 made of stainless steel having a great linear expansion coefficient expands more than the housing 36. Solder therefore can be received in a space formed between the inner periphery on the other side of the cylinder 44 and the outer periphery of the housing 36 (small diameter tube portion 36C). This makes it possible to improve sealability between the cylin- der 44 and the housing 36 (small diameter tube portion 36C).

As illustrated in FIG. 4, the fixing hole 39A of the yoke 39 includes the large diameter hole portion 39F having a larger inner diameter dimension than the small diameter hole portion 39E. The non-contact portion 45 is thus formed between the cylinder 44 and the yoke 39, that is, between the outer periphery of the cylinder 44 and the inner periphery of the yoke 39 (the inner face of the fixing hole 39A, the inner peripheral surface of the tubular projecting portion 39C). Therefore, even if the cylinder 44 made of stainless steel having a great linear expansion coefficient is liable to expand more than the yoke 39 when the cylinder 44 and the yoke 39 are raised in temperature along with brazing, solder can be received in the non-contact portion 45 between the outer periphery of the cylinder 44 and the inner periphery of the yoke 39 (the inner face of the fixing hole 39A, the inner peripheral surface of the tubular projecting portion 39C). This makes it possible to improve sealability between the cylinder 44 and the yoke 39 (fixing hole 39A).

The joining of the cylinder 44 and the housing 36 and/or the joining of the cylinder 44 and the yoke 39 may be configured by the cylinder 44, the housing 36 and/or the yoke 39 being heated to be joined by another joining means than brazing (for example, joining means achieved by weld- ing, such as laser welding). In other words, the cylinder 44 may be joined to the housing 36 and the yoke 39 by welding.

The armature 48 is a mover comprising a magnetic element that is provided between the accommodating tube portion 36A of the housing 36 and the concave indent portion 41B of the anchor 41 so as to movable in the winding axis direction of the coil 34A. The armature 48 is arranged at the inner peripheral side of the accommodating tube portion 36A of the housing 36, the concave indent portion 41B of the anchor 41, the tubular projecting portion 39C of the yoke 39, and the cylinder 44. The armature 48 is axially movable between the accommodating tube portion 36A of the housing 36 and the concave indent portion 41B of the anchor 41. In other words, the armature 48 is arranged at the inner peripheral side of the accommodating tube portion 36A of the housing 36 and the concave indent portion 41B of the anchor 41 and movable in the axial direction through the first and second bushes 38, 43 and the actuating pin 49 by magnetic force generated in the coil 34A.

The armature 48 is fixed to (integrated with) the actuating pin 49 extending through the center of the armature 48 and moves with the actuating pin 49. The actuating pin 49 is slidably supported in the axial direction by the lid portion 36B of the housing 36 and the anchor 41 through the first and second bushes 38 and 43. The armature 48 is formed of an iron-based magnetic element to have a substantially cylindrical shape, for example, like the housing 36, the yoke 39, and the anchor 41. Thrust force is generated in the armature 48 by magnetic force generated in the coil 34A. The thrust force acts in a direction of being absorbed into the concave indent portion 41B of the anchor 41.

The actuating pin 49 is a shaft portion that transmits the thrust force of the armature 48 to the pilot valve element 32 of the damping force adjustment valve 18 (control valve). The actuating pin 49 is formed of a hollow rod. The armature 48 is integrally fixed to an axially middle portion of the actuating pin 49 using means such as press-fitting. The armature 48 and the actuating pin 49 are thus sub-assembled. The actuating pin 49 is slidably supported at both axial sides by the lid portion 36B on the housing 36 side and the yoke 39 (anchor 41) through the first and second bushes 38 and 43.

One side (a left end portion in FIG. 2 and a lower end portion in FIG. 3) of the actuating pin 49 axially protrudes from the anchor 41 (yoke 39). The pilot valve element 32 of the damping force adjustment valve 18 is fixed to a protruding end on the one side of the actuating pin 49. The pilot valve element 32 therefore moves in the axial direction together with the armature 48 and the actuating pin 49 in an integral manner. In other words, a preset valve-opening pressure of the pilot valve element 32 is a pressure value corresponding to the thrust force of the armature 48 based on energization of the coil 34A. The armature 48 moves in the axial direction due to the magnetic force from the coil 34A, to thereby open/close the pilot valve (namely, the pilot valve element 32 with respect to the pilot body 26) of the hydraulic shock absorber 1.

The cover member 51 is a magnetic element cover that covers the mold coil 34 from outside in conjunction with the other side tube portion 39H of the yoke 39. The cover member 51 is formed of magnetic material (magnetic element) as a lid element that covers the mold coil 34 from the other axial side and forms a magnetic circuit (magnetic path) outside the mold coil 34 (coil 34A) in conjunction with the other side tube portion 39H of the yoke 39. The cover member 51 is formed into a tube with a lid as a w % bole. The cover member 51 is generally configured by the cylindrical fitted tube portion 51A and the lid plate 51B in the shape of a circular plate which closes the other side (a right end portion in FIG. 2 and an upper end portion in FIG. 3) of the fitted tube portion 51A.

The fitted tube portion 51A of the cover member 51 is configured to be fitted over an outer periphery of the lid portion 36B of the housing 36 and, in this position, accommodate the lid portion 36B of the housing 36 inside. The lid plate 51B of the cover member 51 is so configured that an outer peripheral side thereof is the annular flanged portion 51C extending outside the fitted tube portion 51A in the radial direction, and an outer peripheral edge of the flanged portion 51C is fixed to the swaged portion 39J provided in the other side tube portion 39H of the yoke 39. The other side tube portion 39H of the yoke 39 and the lid plate 51B of the cover member 51 are thus preliminarily assembled (sub-assembled) together with the mold coil 34 built-in on the inside as illustrated in FIG. 3.

In the state where the mold coil 34 is built-in on the inside of the other side tube portion 39H of the yoke 39 and the lid plate 51B of the cover member 51 as described above, the lid portion 36B of the housing 36 is fitted inside the fitted tube portion 51A of the cover member 51. This enables transmission of magnetic flux among the fitted tube portion 51A and the lid plate 51B of the cover member 51 and the yoke 39. The resin member 34C of the mold coil 34 is fitted to an outer periphery of the fitted tube portion 51A of the cover member 51, and a seal groove 51D is formed in the outer periphery thereof over the whole circumference. A seal member (O-ring 52, for example) is placed in the seal groove 51D. The O-ring 52 seals a space between the mold coil 34 and the cover member 51 (fitted tube portion 51A) in a liquid tight manner. This prevents dust containing rain water or mud water from entering through the space between the cover member 51 and the mold coil 34 into a space between the housing 36 and the mold coil 34 and a space between the housing 36 and the cover member 51.

The yoke 39 and the cover member 51 are fastened, with the mold coil 34 built-in on the inside as illustrated in FIG. 3, to the valve case 19 of the damping force adjustment valve 18 using the lock nut 53 and the non-slip ring 54 as fastening members as illustrated in FIG. 2. In such a case, the non-slip ring 54 is attached to the engaging concave portion 39L of the yoke 39 prior to the attachment of the lock nut 53. The non-slip ring 54 partially protrudes from the engaging concave portion 39L of the yoke 39 in the radially outward direction and is configured to transmit fastening force of the lock nut 53 to the one side tube portion 39G of the yoke 39.

The lock nut 53 is formed into a stepped tubular element. The lock nut 53 is provided with an internal thread portion 53A and an engaging tube portion 53B. The internal thread portion 53A is located at one axial side of the lock nut 53 and threadedly engaged with an external thread portion 19B of the valve case 19 at an inner peripheral side. The engaging tube portion 53B is bent radially inwards to have an inner diameter dimension that is smaller than an outer diameter dimension of the non-slip ring 54. The engaging tube portion 53B is engaged with the non-slip ring 54 from outside. The lock nut 53 is a fastening member for integrally joining the damping force adjustment valve 18 and the solenoid 33 by threadedly engaging the internal thread portion 53A with the external thread portion 19B of the valve case 19 with an inner surface of the engaging tube portion 53B abutting against the non-slip ring 54 placed in the engaging concave portion 39L of the yoke 39.

The solenoid 33, the damping force adjustment mechanism 17, and the hydraulic shock absorber 1 according to the present embodiment are configured as described above. The following discussion explains the actuation thereof.

First, when the hydraulic shock absorber 1 is mounted on a vehicle, such as an automobile, for example, an upper side (protruding side) of the piston rod 8 is attached to a vehicle body side of the vehicle, and the attachment eye 3A side provided in the bottom cap 3 is attached to a wheel side. The solenoid 33 of the damping force adjustment mechanism 17 is connected to a control device (controller) provided at the vehicle body side of the vehicle through a cable of electric wiring, neither shown.

When the vehicle is in drive, the piston rod 8 is so displaced as to be expanded from and compressed into the outer tube 2 in response to generation of vertical vibrations produced due to irregularity of road surfaces or another like factor. This makes it possible to generate damping force by the damping force adjustment mechanism 17 and the like and thus absorb the vibrations of the vehicle. At this point, the generated damping force of the hydraulic shock absorber 1 can be variably adjusted by using the controller to control a value of electric current applied to the coil 34A of the solenoid 33 and thus adjusting valve-opening pressure of the pilot valve element 32.

For example, during an extension (expansion) stroke of the piston rod 8, a compression-side check valve 7 of the piston 5 is closed by motion of the piston 5 within the inner tube 4. Before the disc valve 6 of the piston 5 is opened, the oil liquid in the rod-side fluid chamber B is pressurized and flows through the fluid hole 4A of the inner tube 4, the annular fluid chamber D. and the connecting port 12C of the middle tube 12 into the fluid passage 20B of the connecting pipe element 20 of the damping force adjustment valve 18. At this point, the oil liquid of amount corresponding to the motion of the piston 5 opens an extension-side check valve 16 of the bottom valve 13 and flows from the reservoir chamber A into the bottom-side fluid chamber C. When the pressure in the rod-side fluid chamber B reaches valve-opening pressure of the disc valve 6, the disc valve 6 is opened, and the pressure in the rod-side fluid chamber B is released into the bottom-side fluid chamber C.

In the damping force adjustment mechanism 17, before the main valve 23 is opened (low piston speed region), the oil liquid that flows into the fluid passage 20B of the connecting pipe element 20 passes through the center hole 21A of the valve member 21, the center hole 24B of the pilot pin 24, and the center hole 26C of the pilot body 26, pushes open the pilot valve element 32, and flows inside the pilot body 26 as shown by arrow X in FIG. 2. The oil liquid that flows inside the pilot body 26 runs between the flange portion 32A of the pilot valve element 32 and the disc valve 29, passes through the fluid passage 30A of the holding plate 30, the notch 31A of the cap 31, and the fluid chamber 19C of the valve case 19, and flows into the reservoir chamber A. When the pressure in the fluid passage 20B of the connecting pipe element 20, that is, the pressure in the rod-side fluid chamber B reaches valve-opening pressure of the main valve 23 along with an increase in piston speed, the oil liquid that flows into the fluid passage 20B of the connecting pipe element 20 passes through the fluid passage 21B of the valve member 21, pushes open the main valve 23, and flows into the reservoir chamber A through the fluid chamber 19C of the valve case 19 as shown by arrow Y in FIG. 2.

During the compression stroke of the piston rod 8, the motion of the piston 5 within the inner tube 4 opens the compression-side check valve 7 of the piston 5 and closes the extension-side check valve 16 of the bottom valve 13. Before the bottom valve 13 (disc valve 15) is opened, the oil liquid in the bottom-side fluid chamber C flows into the rod-side fluid chamber B. At the same time, the oil liquid of amount corresponding to the entry of the piston rod 8 into the inner tube 4 flows from the rod-side fluid chamber B through the damping force adjustment valve 18 into the reservoir chamber A through the same course as during the extension stroke. When the pressure in the bottom-side fluid chamber C reaches valve-opening pressure of the bottom valve 13 (disc valve 15), the bottom valve 13 (disc valve 15) is opened to release the pressure in the bottom-side fluid chamber C into the reservoir chamber A.

During the extension and compression strokes of the piston rod 8, therefore, before the main valve 23 of the damping force adjustment valve 18 is opened, the damping force is generated by the orifice 24C of the pilot pin 24 and the valve-opening pressure of the pilot valve element 32, and after the main valve 23 is opened, the damping force is generated according to the opening degree of the main valve 23. In such a case, the damping force can be directly controlled, regardless of the piston speed, by adjusting the valve-opening pressure of the pilot valve element 32 through energization of the coil 34A of the solenoid 33.

In particular, if the thrust force of the armature 48 is reduced by decreasing the electric current applied to the coil 34A, the valve-opening pressure of the pilot valve element

32 is reduced to generate a soft damping force. If the thrust force of the armature 48 is increased by increasing the electric current applied to the coil 34A, the valve-opening pressure of the pilot valve element 32 is raised to generate a hard damping force. In these situations, the valve-opening pressure of the pilot valve element 32 changes the inner pressure of the back pressure chamber 27 that is in communication with the pilot valve element 32 through the fluid passage 25 located on an upstream side. The valve-opening pressure of the pilot valve element 32 is thus controlled, which makes it possible to adjust the valve-opening pressure of the main valve 23 at the same time and enlarge an adjustment range of damping force characteristics.

If the thrust force of the armature 48 is lost, attributable to breaking of the coil 34A or another reason, the pilot valve element 32 is retreated (displaced in a direction away from the valve seat portion 26E) by the return spring 28, and the flange portion 32A of the pilot valve element 32 and the disc valve 29 abut against each other. In such a state, the damping force can be generated by the valve-opening pressure of the disc valve 29. In the event of a failure, such as the breaking of a coil, a necessary damping force can be obtained.

According to the present embodiment, as illustrated in FIGS. 3 to 5, the cylinder 44 of the solenoid 33 is so configured that the outer periphery (outer peripheral surface) on the one side in the winding axis direction of the coil 34A is joined to the inner periphery (inner peripheral surface) of the yoke 39 (tubular projecting portion 39C), and the inner periphery (inner peripheral surface) on the other side is joined to the outer periphery (outer peripheral surface) of the housing 36 (small diameter tube portion 36C). This makes it possible to eliminate the need for a yoke between the anchor 41 (lateral face portion 41D) and the cylinder 44. This allows the anchor 41 (concave indent portion 41B, namely, the cylindrical protruding portion 41C) to be increased in diameter and also allows the armature 48 to be increased in diameter while securing the wall thickness of the anchor 41 (more specifically, the wall thickness of the protruding portion 41C of the anchor 41). Consequently, the axial length of the solenoid 33 can be reduced, and the thrust characteristics of the solenoid 33 (armature 48) can be improved at the same time.

In addition, it is unnecessary to join the cylinder 44 and the anchor 41, so that the protruding portion 41C of the anchor 41 can be restrained from tilting (restrain the protruding portion 41C from leaning inwards) which is caused by joining the cylinder 44 and the anchor 41. This, too, makes it possible to improve the thrust characteristics of the solenoid 33 (armature 48). The wall thickness of the anchor 41 (protruding portion 41C) and of the cylinder 44 can be secured without providing a large diameter portion (flared portion) to the cylinder 44. It is then possible to not only reduce magnetic saturation and restrain a decrease in thrust force but also simplify the shape of the cylinder 44 or, for example, form the cylinder 44 into a mere cylindrical shape. This makes it possible to reduce material cost and processing cost for the cylinder 44.

Since it is not necessary to provide a large diameter portion (flared portion) to the cylinder 44, the coil 34A can be moved closer to the anchor 41 (the axially opposite side from the housing 36), which makes it possible to reduce the axial length of the solenoid 33. An accommodating region of the coil 34A is not decreased, so that the number of windings of the coil and the resistance value of the coil can be maintained as desired. In addition, since the cylinder 44 is formed into a mere cylindrical shape, it is possible to omit the inner diameter side projection provided to the inner face of the joining member of Patent Literature 1, that is, the inner diameter side projection used for positioning the housing (core 74). This makes it possible to improve a freedom degree of design of the solenoid 33.

In any case, the present embodiment can reduce the axial length of the solenoid 33 and yet improve the thrust characteristics of the solenoid 33 (armature 48). It is therefore possible to downsize the damping force adjustment mechanism 17 (reduce the axial length) and yet improve the characteristics (valve-opening characteristics) of the pilot valve element 32 and the characteristics (valve-opening characteristics) of the main valve 32, and therefore the damping force characteristics of the hydraulic shock absorber 1.

According to the present embodiment, the housing 36, the cylinder 44, and the yoke 39 are joined together with solder. The housing 36, the cylinder 44, and the yoke 39 thus can be tightly sealed and configured as a pressure container (sealed container).

According to the present embodiment, as illustrated in FIG. 4, the non-contact portion 45 is formed between the cylinder 44 and the yoke 39, that is, between the outer periphery of the cylinder 44 and the inner periphery of the yoke 39 (the inner face of the fixing hole 39A, the inner peripheral surface of the tubular projecting portion 39C). Solder therefore enters the non-contact portion 45, which makes it possible to join the outer periphery of the cylinder 44 with the inner periphery of the yoke 39 (the inner face of the fixing hole 39A, the inner peripheral surface of the tubular projecting portion 39C) using the solder in a stable manner. Other regions than the non-contact portion 45 can be used as the press-fitting portion 46 where the cylinder 44 is press-fitted in the yoke 39 (the fixing hole 39A, the inner side of the tubular projecting portion 39C). This enables the alignment of the cylinder 44 and the yoke 39. In other words, it is possible to achieve the space into which the solder is introduced and the alignment at the same time.

According to the present embodiment, the cylinder 44 is formed of material having a different linear expansion coefficient from material of which the yoke 39 and the housing 36 are formed. In particular, the cylinder 44 is made of stainless steel, and the housing 36 and the yoke 39 are made of mechanical structural carbon steel (S10C). Therefore, when the cylinder 44 and the housing 36 (small diameter tube portion 36C) are raised in temperature along with brazing, the cylinder 44 made of stainless steel having a great linear expansion coefficient expands more than the housing 36 (small diameter tube portion 36C). Solder therefore can be received in the space between the inner periphery on the other side of the cylinder 44 and the outer periphery of the housing 36 (small diameter tube portion 36C). This makes it possible to improve sealability between the cylinder 44 and the housing 36 (small diameter tube portion 36C).

The non-contact portion 45 is formed between the outer periphery on one side of the cylinder 44 and the inner periphery of the yoke 39 (the inner face of the fixing hole 39A, the inner peripheral surface of the tubular projecting portion 39C). Therefore, even if the cylinder 44 made of stainless steel having a great linear expansion coefficient is liable to expand more than the yoke 39 (tubular projecting portion 39C) w % ben the cylinder 44 and the yoke 39 are raised in temperature along with brazing, solder can be received in the non-contact portion 45 between the outer periphery on the one side of the cylinder 44 and the inner periphery of the yoke 39 (the inner face of the fixing hole 39A, the inner peripheral surface of the tubular projecting portion 39C).

The embodiment is discussed with an example where the non-contact portion 45 (and the press-fitting portion 46) is formed between the outer periphery of the cylinder 44 and the inner periphery of the yoke 39 (the inner face of the fixing hole 39A, the inner peripheral surface of the tubular projecting portion 39C) by providing the small diameter hole portion 39E and the large diameter hole portion 39F in the inner periphery of the yoke 39 (the inner face of the fixing hole 39A, the inner peripheral surface of the tubular projecting portion 39C). The invention, however, does not necessarily have to be configured as discussed above. For example, the invention may be so configured that a non-contact portion (and a press-fitting portion) is formed between the outer periphery of a cylinder (joining member) and the inner periphery of a yoke by providing a large diameter portion having a greater outer diameter dimension than other portions in one axial side end portion of the cylinder (joining member) (yoke-side end portion of the cylinder).

The embodiment is discussed with an example where the one axial side end face of the cylinder 44 abuts against the lateral face (lateral face on the coil 34A side) of the inwardly flanged portion 39D of the yoke 39. The invention, however, does not necessarily have to be configured as discussed above. For example, as seen in a first modification example illustrated in FIG. 6, the fixation of the anchor 41 to the fixing hole 39A of the yoke 39 may be carried out by means such as press-fitting that press-fits an annular flange portion 62 of the anchor 41 in an inwardly flanged portion 61 of the fixing hole 39A of the yoke 39, and the one axial side end face of the cylinder 44 may be brought into abutment against both the inwardly flanged portion 61 and the annular flange portion 62. In this case, too, a space (radial space) is provided between an inner peripheral surface of the cylinder 44 and a lateral face portion 41D (except an annular flange portion 41E) of the anchor 41. It is then possible to restrain a protruding portion 41C of the anchor 41 from tilting (restrain the protruding portion 41 from leaning inwards).

The embodiment is discussed with an example where the cylinder 44 is joined to the housing 36 and the yoke 39 with solder. The invention, however, does not necessarily have to be configured as discussed above. For example, the cylinder 44 may be joined to the housing 36 and the yoke 39 by welding. Instead of brazing or welding, the joining also may be achieved by fitting (press-fitting). In such a case, for example, as seen in a second modification example illustrated in FIG. 7, O-rings 71 and 72 may be respectively arranged between the housing 36 and the cylinder 44 and between the cylinder 44 and the yoke 39. In such a case, a space between the housing 36 and the cylinder 44 can be tightly sealed by the O-ring 71, and a space between the cylinder 44 and the yoke 39 can be tightly sealed by the O-ring 72. The housing 36, the cylinder 44, and the yoke 39 thus can be configured as a pressure container.

The embodiment is discussed with an example where the cylinder 44 is formed as a mere cylindrical element. In such a case, since the other side (housing 36 side) end face (open end face) of the cylinder 44 abuts against a proximal end side stepped surface of the small diameter tube portion 36C of the housing 36, the alignment (axial positioning) of the cylinder 44 and the housing 36 can be achieved. The invention, however, does not necessarily have to be configured as discussed above. For example, as seen in a third modification example illustrated in FIGS. 8 and 9, a projection 82 (positioning projection) protruding inwards may be provided in an inner side (inner periphery) of a cylinder 81 over the whole circumference (or partly at a plurality of places). In such a case, the alignment (axial positioning) of the cylinder 81 and the housing 36 can be achieved by abutment of the "projection 82" against a "distal end side (open side) end face of a small diameter tube portion 36C of the housing 36."

Figure 8:
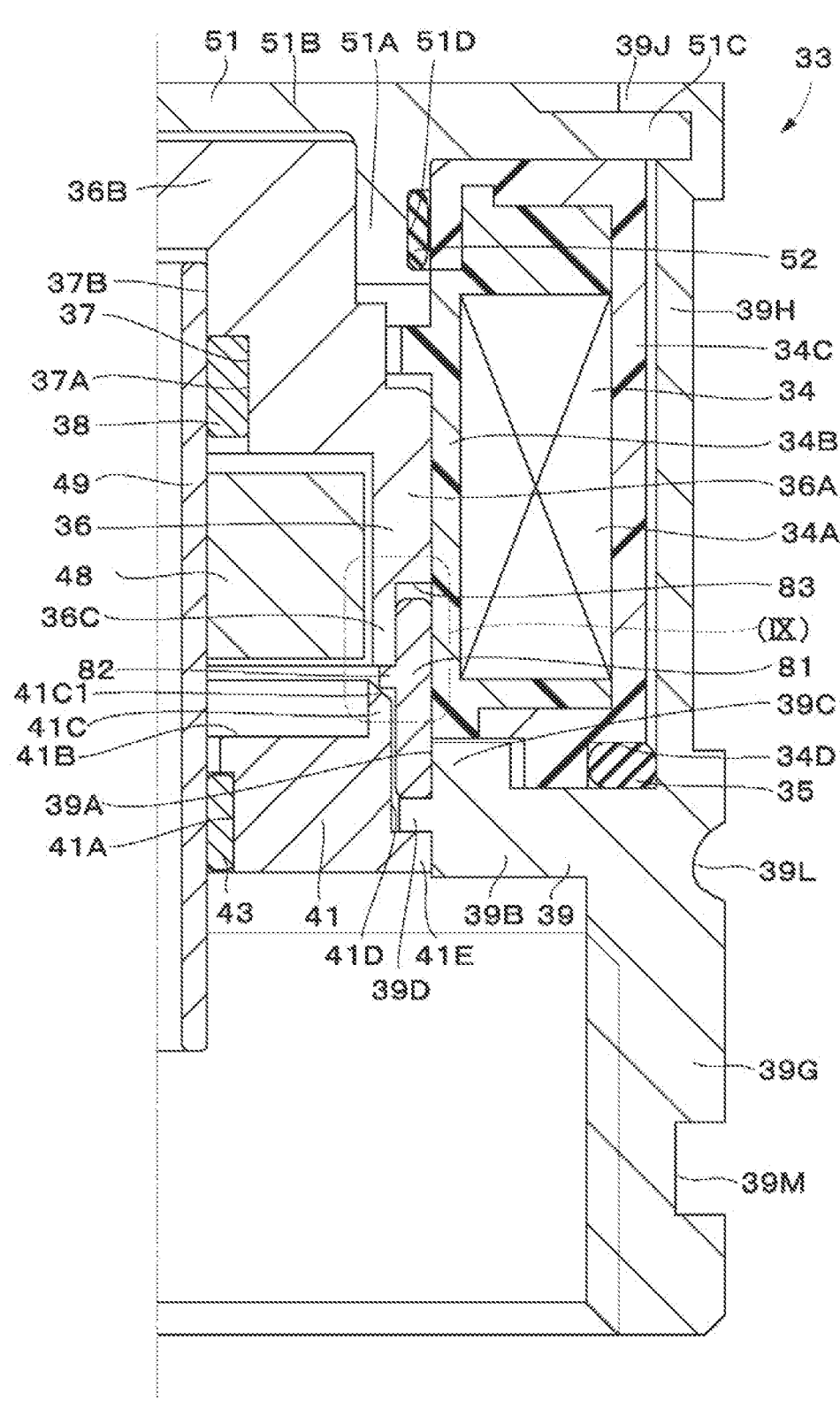
FIG. 8 is a half sectional view of a solenoid according to a third modification example.
Figure 9:
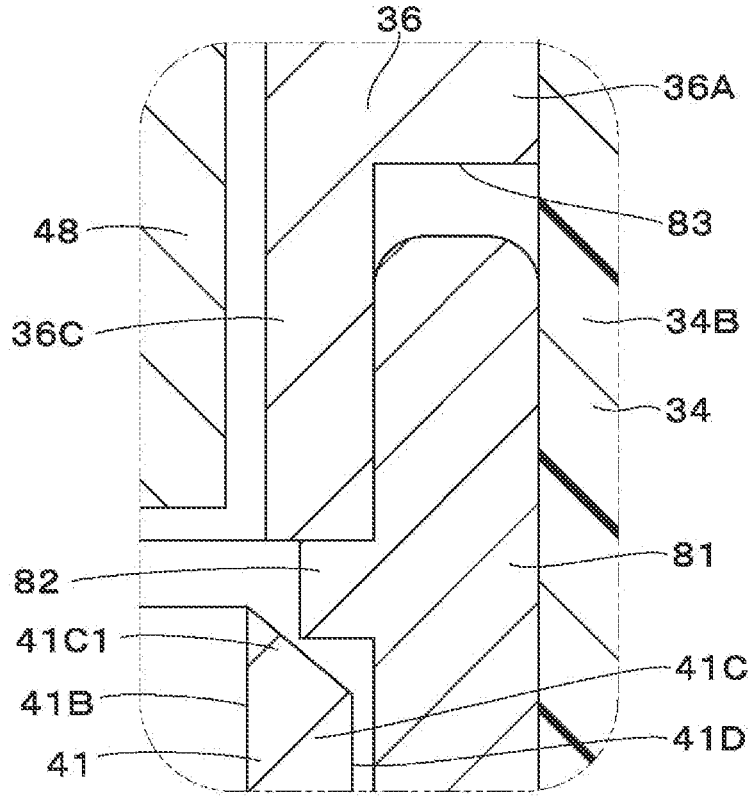
FIG. 9 is an enlarged sectional view of a (IX) region in FIG. 8.
Figure 10:
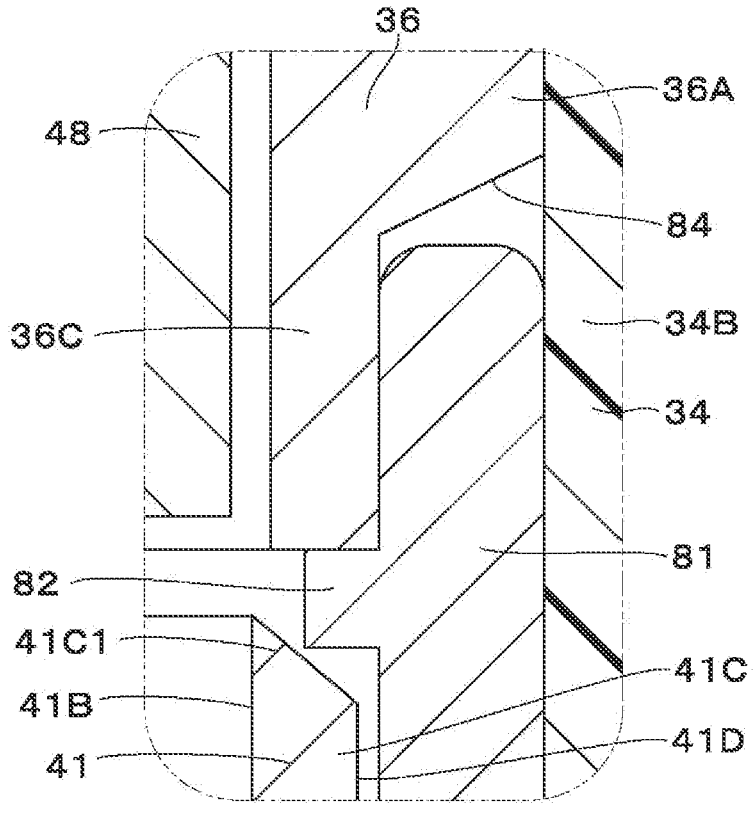
FIG. 10 is a sectional view of the same region as FIG. 9 which shows a solenoid according to a fourth modification example.

The third modification example illustrated in FIGS. 8 and 9 is discussed with an example where a proximal end side stepped surface 83 of the small diameter tube portion 36 of the housing 36, that is, the stepped surface 83 facing the other side (housing 36 side) end face (open end face) of the cylinder 81 is a flat surface orthogonal to a central axis of the small diameter tube portion 36C. In such a case, a gap between the stepped surface 83 and the other side (housing 36 side) end face (open end face) of the cylinder 81 can be used as a clearance (space) for accommodating solder. Instead of the foregoing configuration, for example, as seen in a fourth modification example illustrated in FIG. 10, a proximal end side stepped surface 84 of a small diameter tube portion 36C of a housing 36, that is, the stepped surface 84 facing the other side (housing 36 side) end face (open end face) of a cylinder 81 may be formed into a tapered face (circular cone-shaped surface) inclined to a plane orthogonal to a central axis of the small diameter tube portion 36C.

In other words, the stepped surface 84 may be a tapered face (circular cone-shaped surface) inclined in such a direction that an outer diameter dimension gradually increases from the proximal end side toward the other axial side (toward the lid portion 36B of the housing 36) of the small diameter tube portion 36C. In such a case, too, a gap between the stepped surface 84 and the other side (housing 36 side) end face (open end face) of the cylinder 81 can be used as a clearance (space) for accommodating solder. According to the embodiment, for example, as illustrated in FIG. 5, a proximal end side stepped surface 91 of the small diameter tube portion 36C of the housing 36 is configured by a flat surface 92 (orthogonal surface) orthogonal to a central axis of the small diameter tube portion 36C and a tapered face 93 (circular cone-shaped surface) inclined to the flat surface 92. The flat surface 92 abuts against the other side (housing 36 side) end face (open end face) of the cylinder 44. Alignment (axial positioning) of the cylinder 44 and the housing 36 thus can be achieved. A gap between the tapered surface 93 (circular cone-shaped surface) and the other side (housing 36 side) end face (open end face) of the cylinder 44 can be used as a clearance (space) for accommodating solder.

The embodiment is discussed with an example where the press-fitting portion 46 and the non-contact portion 45 are provided between the cylinder 44 and the yoke 39 (tubular projecting portion 39C). The invention, however, does not necessarily have to be configured as discussed above. For example, as seen in a fifth modification example illustrated in FIG. 11, a press-fitting portion 98 may be provided between a cylinder 44 and a yoke 39 (tubular projecting portion 39C), and the non-contact portion 45 extending in the axial direction as in the first embodiment may be omitted. In such a case, an outer periphery of the cylinder 44 which configures the press-fitting portion 98 is designed to have higher surface coarseness than other portions (for example, an inner periphery of the cylinder 44 and an inner periphery of a fixing hole 39A of the yoke 39). In the fifth modification example, therefore, the outer periphery of the cylinder 44 is provided with higher surface coarseness, as compared to other portions (for example, an inner periphery of the cylinder 44 and an inner periphery of the fixing hole 39A of the yoke 39).

The outer periphery of the cylinder 44 can be provided with high surface coarseness by decreasing a rotational speed of work (cylinder 44) or increasing blade feeding speed in a cutting machining step or a grinding processing step. The decrease of rotational speed of the work (cylinder 44) or the increase of the blade feeding speed forms ridges and valleys of a machined groove, namely, a concave-convex portion 99 in the outer periphery of the cylinder 44. In this way, the outer periphery of the cylinder 44 can be provided with high surface coarseness. The surface coarseness is preferably, for example, surface roughness Ra 6.3 or higher (arithmetic average coarseness).

The foregoing configuration makes it possible to secure a space between the outer periphery of the cylinder 44 and the inner periphery of the fixing hole 39A of the yoke 39 within a furnace (at high temperature) and flow solder into the space. General surface roughness provided by cutting machining is Ra 6.3. Surface roughness used for fitting is Ra 8.0 at the highest. For example, surface roughness higher than Ra 8.0 creates excessive press-fitting load and might make press-fitting impossible. Preferable surface roughness is therefore considered to range from Ra 6.3 to Ra 12.5 (if surface roughness is too high, a tolerance range becomes broad). In order to increase the surface coarseness of the outer periphery of the cylinder 44, irregular small dimples, vertical grooves or the like may be formed in the outer periphery of the cylinder 44. In other words, a space that allows solder to flow therethrough may be formed between the outer periphery of the cylinder 44 and the inner periphery of the fixing hole 39A of the yoke 39 (between the two members), and a processing method that can form such a space is employed.

Figure 11:
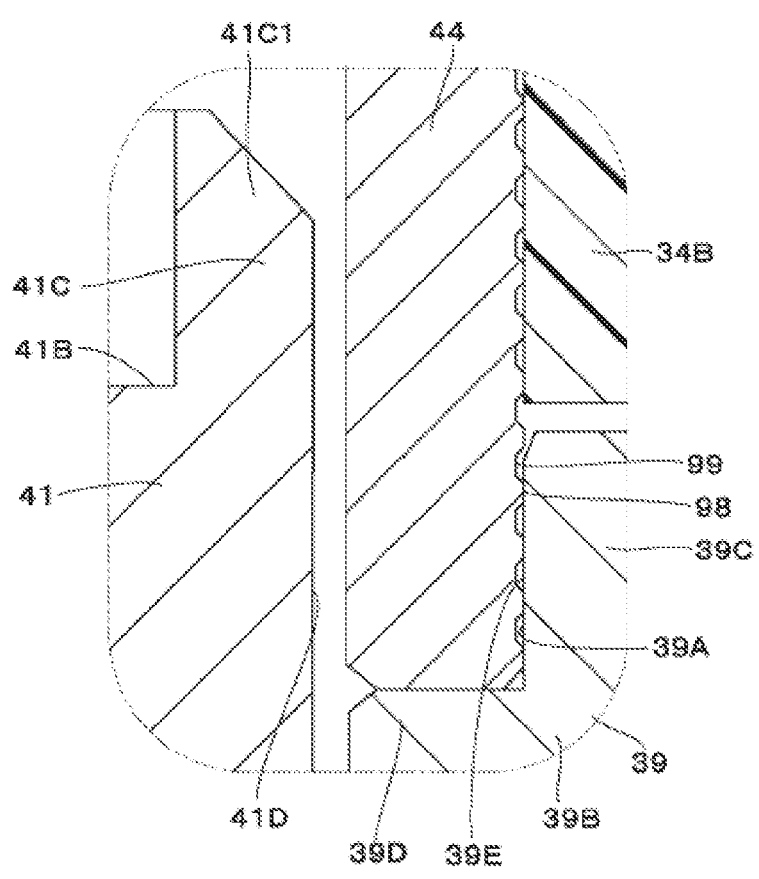
FIG. 11 is a sectional view of the same region as FIG. 4 which shows a solenoid according to a fifth modification example.

The fifth modification example illustrated in FIG. 11 is discussed with an example where the outer periphery of the cylinder 44 is provided with high surface coarseness. The invention, however, does not necessarily have to be configured as discussed above. For example, the inner periphery of the yoke (fixing hole) may be provided with high surface coarseness. In either case, that is, either if the outer periphery of the cylinder or the inner periphery of the yoke is made coarse, the cylinder and the yoke can be increased in press-fitting length and improved in coaxiality. A brazed portion is also increased in length, which makes it possible to improve strength. Additionally, the surface coarseness is surface roughness provided by general machining, so that processing cost can be reduced.

The embodiment is discussed with an example where the anchor 41 is fixed by being press-fitted in the fixing hole 39A of the yoke 39. The invention, however, does not necessarily have to be configured as discussed above. For example, a stator may be fixed inside the yoke using threadedly engaging means, such as a screw, caulking (staking, swaging, and crimping) means or another like means. Same applies to the first to fifth modification examples.

The embodiment is discussed with an example where the other side tube portion 39H is provided in the yoke 39, and the distal end side (the other axial side) of the other side tube portion 39H is fixed to the outer peripheral side of the cover member 51 by the swaged portion 39J. The invention, however, does not necessarily have to be configured as discussed above. For example, the annular portion and the other side tube portion of the yoke may be formed as separate elements, and the other side tube portion may be formed integrally with the cover member. Same applies to the first to fifth modification examples.

The embodiment is discussed with an example where the solenoid 33 is configured as a proportional solenoid. The invention, however, does not necessarily have to be configured as discussed above. For example, the solenoid may be configured as an on-off solenoid. Same applies to the first to fifth modification examples.

The embodiment and the modification examples are discussed with an example where the solenoid 33 is used as a variable damping force actuator of the hydraulic shock absorber 1, that is, the pilot valve element 32 configuring the pilot valve of the damping force adjustment valve 18 is a driven target of the solenoid 33. The invention, however, does not necessarily have to be configured as discussed above. A solenoid can be widely used, for example, as an actuator installed in every kind of mechanical device, such as a valve used in a hydraulic circuit, that is, as a driving device that drives a driven target to be linearly driven.

For example, the following modes are possible for the solenoids, the damping force adjustment mechanisms, and the damping force adjustable shock absorbers according to the above-discussed embodiment and modification examples.

A first mode provides a solenoid comprising a coil wound into an annular shape and configured to generate magnetic force by being energized; an accommodating member comprising a magnetic element arranged at the inner periphery of the coil, extending in a winding axis direction of the coil, and provided with an accommodating portion with one end opened; a mover provided in the accommodating portion so as to be movable in the winding axis direction of the coil and comprising a magnetic element; a stator provided at such a position as to face an opening of the accommodating portion and so configured that a protruding portion protruding toward the opening of the accommodating portion and a lateral face portion extending from an outer periphery of the protruding portion in a direction away from the opening of the accommodating portion are integrally formed by a magnetic element; a yoke including a fixing hole with an inner peripheral surface facing a part of the lateral face portion of the stator; and a joining member configured to be joined to an inner periphery of the yoke at an outer periphery on one side in a winding axis direction of the coil and joined to an outer periphery of the accommodating member at an inner periphery on the other side, the joining member comprising a non-magnetic element.

According to the first mode, the joining member is joined to the inner periphery of the yoke at the outer periphery on the one side in the winding axis direction of the coil and joined to the outer periphery of the accommodating member at the inner periphery on the other side. It is therefore possible to eliminate the need for a yoke between the stator and the joining member. This makes it possible to increase the diameter of the stator and increase the diameter of the mover while securing the wall thickness of the stator (or more specifically, the wall thickness of the protruding portion of the stator). It is consequently possible to reduce the axial length of the solenoid and yet improve thrust characteristics of the solenoid (mover). It is moreover unnecessary to join the joining member and the stator, so that it is possible to restrain the protruding portion of the stator from tilting (restrain the protruding portion from leaning inwards) due to the joining of the joining member and the stator. This, too, makes it possible to improve the thrust characteristics of the solenoid (mover). The wall thickness of the stator and of the joining member also can be secured without providing a large diameter portion (flared portion) to the joining member. It is then possible to not only restrain magnetic saturation and a decrease in thrust force but simplify the shape of the joining member or, for example, form the joining member into a mere cylindrical shape. This makes it possible to reduce material cost and processing cost for the joining member. Without the necessity of providing a large diameter portion (flared portion) to the joining member, the coil can be moved closer to the stator (axially opposite side from the accommodating member side), which makes it possible to reduce the axial length of the solenoid.

In a second mode according to the first mode, the joining member is joined to the accommodating member and the yoke with solder. According to the second mode, the accommodating member, the joining member, and the yoke can be tightly sealed by joining the accommodating member, the joining member, and the yoke with solder. The accommodating member, the joining member, and the yoke thus can be configured as a pressure container.

In a third mode according to the second mode, anoncontact portion is formed in the joining member and the yoke on the accommodating member side in the winding axis direction of the coil. The non-contact portion is where the outer periphery of the joining member and the inner periphery of the yoke are not in contact with each other. According to the third mode, the outer periphery of the joining member and the inner periphery of the yoke can be joined with solder in a stable manner by the solder entering the non-contact portion. Other portions than the non-contact portion can be a press-fitting portion at which the yoke and the joining member are press-fitted together. This enables the alignment of the joining member and the yoke. In other words, it is possible to achieve both the space into which the solder is introduced and the alignment at the same time.

In a fourth mode according to the first mode, the joining member is formed of material having a different linear expansion coefficient from material of which the yoke and the accommodating member are formed. According to the fourth mode, for example, the joining member may be made of stainless steel, and the accommodating member may be made of mechanical structural carbon steel (S10C). In such a case, for example, when the joining member and the accommodating member are raised in temperature along with brazing, the joining member made of stainless steel having a great linear expansion coefficient expands more than the accommodating member. Solder therefore can be received in a space between the inner periphery on the other side of the joining member and the outer periphery of the accommodating member. This makes it possible to improve sealability between the joining member and the accommodating member.

In a fifth mode according to the first mode, an O-ring is arranged between the accommodating member and the joining member and between the joining member and the yoke. According to the fifth mode, a space between the accommodating member and the joining member can be tightly sealed by the O-ring. The accommodating member, the joining member, and the yoke thus can be configured as a pressure container.

In a sixth mode according to the first mode, the joining member is joined to the accommodating member and the yoke by welding. According to the sixth mode, the accommodating member, the joining member, and the yoke can be tightly sealed by joining the accommodating member, the joining member, and the yoke through welding. The accommodating member, the joining member, and the yoke thus can be configured as a pressure container.

In a seventh mode according to any one of the first to sixth modes, the protruding portion includes a reduced diameter portion with an outer diameter gradually reduced toward the opening of the accommodating portion. According to the seventh mode, the thrust characteristics can be improved by the reduced diameter portion.

In an eighth mode according to any one of the first to seventh modes, the outer periphery of the joining member or the inner periphery of the yoke has higher surface coarseness than other portions. According to the eighth mode, the joining member and the yoke can be increased in press-fitting length and improved in coaxiality. A brazed portion is also increased in length, which makes it possible to improve strength. Additionally, the surface coarseness is surface roughness provided by general machining, so that processing cost can be reduced.

A ninth mode provides a damping force adjustment mechanism comprising a coil wound into an annular shape and configured to generate magnetic force by being energized; an accommodating member comprising a magnetic element arranged at the inner periphery of the coil, extending in a winding axis direction of the coil, and provided with an accommodating portion with one end opened; a mover provided in the accommodating portion so as to be movable in the winding axis direction of the coil and comprising a magnetic element; a control valve configured to be controlled by motion of the mover; a stator provided at such a position as to face an opening of the accommodating portion and so configured that a protruding portion protruding toward the opening of the accommodating portion and a lateral face portion extending from an outer periphery of the protruding portion in a direction away from the opening of the accommodating portion are integrally formed by a magnetic element; a yoke including a fixing hole with an inner peripheral surface facing a part of the lateral face portion of the stator; and a joining member configured to be joined to an inner periphery of the yoke at an outer periphery on one side in a winding axis direction of the coil and joined to an outer periphery of the accommodating member at an inner periphery on the other side, the joining member comprising a non-magnetic element.

According to the ninth mode, as in the first mode, it is possible to reduce axial length of a portion corresponding to a solenoid and yet improve thrust characteristics of the solenoid (mover). This makes it possible to downsize the damping force adjustment mechanism (reduce the axial length) and yet improve the characteristics of the control valve (valve-opening characteristics, for example).

A 10th mode provides a damping force adjustable shock absorber comprising a cylinder in which hydraulic fluid is sealingly contained; a piston slidably provided in the cylinder; a piston rod coupled with the piston and extending out of the cylinder; and a damping force adjustment mechanism configured to control a flow of the hydraulic fluid which is generated by sliding motion of the piston within the cylinder to generate a damping force, the damping force adjustment mechanism comprising a coil wound into an annular shape and configured to generate magnetic force by being energized; an accommodating member comprising a magnetic element arranged at the inner periphery of the coil, extending in a winding axis direction of the coil, and provided with an accommodating portion with one end opened; a mover provided in the accommodating portion so as to be movable in the winding axis direction of the coil and comprising a magnetic element; a control valve configured to be controlled by motion of the mover; a stator provided at such a position as to face an opening of the accommodating portion and so configured that a protruding portion protruding toward the opening of the accommodating portion and a lateral face portion extending from an outer periphery of the protruding portion in a direction away from the opening of the accommodating portion are integrally formed by a magnetic element; a yoke including a fixing hole with an inner peripheral surface facing a part of the lateral face portion of the stator; and a joining member configured to be joined to an inner periphery of the yoke at an outer periphery on one side in a winding axis direction of the coil and joined to an outer periphery of the accommodating member at an inner periphery on the other side, the joining member comprising a non-magnetic element.

According to the 10th mode, as in the first mode, it is possible to reduce axial length of a portion corresponding to a solenoid and yet improve thrust characteristics of the solenoid (mover). This makes it possible to downsize the damping force adjustment mechanism (reduce the axial length) and yet improve the characteristics of the control valve (valve-opening characteristics, for example), therefore damping force characteristics of the damping force adjustable shock absorber.

REFERENCE SIGN LIST

1 Hydraulic shock absorber (damping force adjustable shock absorber)
4 Inner tube (cylinder)
5 Piston
8 Piston rod
17 Damping force adjustment mechanism
32 Pilot valve element (control valve)
33 Solenoid
34A Coil
36 Housing (accommodating member)
36A Accommodating tube portion (accommodating portion)
39 Yoke
39A Fixing hole
41 Anchor (stator)
41C Protruding portion
41C1 Reduced diameter portion
41D Lateral face portion
44, 81 Cylinder (joining member)
48 Armature (mover)
45 Non-contact portion
71, 72 O-ring

The invention claimed is:

1. A solenoid comprising:
a coil wound into an annular shape and configured to generate magnetic force by being energized;
an accommodating member comprising a magnetic element arranged at the inner periphery of the coil, extending in a winding axis direction of the coil, and provided with an accommodating portion with one end opened;
a mover provided in the accommodating portion so as to be movable in the winding axis direction of the coil and comprising a magnetic element;
a stator provided at such a position as to face an opening of the accommodating portion and so configured that a protruding portion protruding toward the opening of the accommodating portion and a lateral face portion extending from an outer periphery of the protruding portion in a direction away from the opening of the accommodating portion are integrally formed by a magnetic element;
a yoke including a fixing hole with an inner peripheral surface facing a part of the lateral face portion of the stator, and
a joining member configured to be joined to an inner periphery of the yoke at an outer periphery on one side in a winding axis direction of the coil and joined to an outer periphery of the accommodating member at an inner periphery on the other side, the joining member comprising a non-magnetic element.

2. The solenoid according to claim 1, wherein the joining member is joined to the accommodating member and the yoke with solder.

3. The solenoid according to claim 2, wherein a non-contact portion is formed in the joining member and the yoke on the accommodating member side in the winding axis direction of the coil, the non-contact portion being where the outer periphery of the joining member and the inner periphery of the yoke are not in contact with each other.

4. The solenoid according to claim 1, where the joining member is formed of material having a different linear expansion coefficient from material of which the yoke and the accommodating member are formed.

5. The solenoid according to claim 1, wherein an O-ring is arranged between the accommodating member and the joining member and between the joining member and the yoke.

6. The solenoid according to claim 1, wherein the joining member is joined to the accommodating member and the yoke by welding.

7. The solenoid according to claim 1, wherein the protruding portion includes a reduced diameter portion with an outer diameter gradually reduced toward the opening of the accommodating portion.

8. The solenoid according to claim 1, wherein the outer periphery of the joining member or the inner periphery of the yoke has higher surface coarseness than other portions.

9. A damping force adjustment mechanism comprising:
   a coil wound into an annular shape and configured to generate magnetic force by being energized;
   an accommodating member comprising a magnetic element arranged at the inner periphery of the coil, extending in a winding axis direction of the coil, and provided with an accommodating portion with one end opened;
   a mover provided in the accommodating portion so as to be movable in the winding axis direction of the coil and comprising a magnetic element;
   a control valve configured to be controlled by motion of the mover;
   a stator provided at such a position as to face an opening of the accommodating portion and so configured that a protruding portion protruding toward the opening of the accommodating portion and a lateral face portion extending from an outer periphery of the protruding portion in a direction away from the opening of the accommodating portion are integrally formed by a magnetic element;

a yoke including a fixing hole with an inner peripheral surface facing a part of the lateral face portion of the stator, and
   a joining member configured to be joined to an inner periphery of the yoke at an outer periphery on one side in a winding axis direction of the coil and joined to an outer periphery of the accommodating member at an inner periphery on the other side, the joining member comprising a non-magnetic element.

10. A damping force adjustable shock absorber comprising:
   a cylinder in which hydraulic fluid is sealingly contained;
   a piston slidably provided in the cylinder;
   a piston rod coupled with the piston and extending out of the cylinder, and
   a damping force adjustment mechanism configured to control a flow of the hydraulic fluid which is generated by sliding motion of the piston within the cylinder to generate a damping force, the damping force adjustment mechanism comprising:
   a coil wound into an annular shape and configured to generate magnetic force by being energized;
   an accommodating member comprising a magnetic element arranged at the inner periphery of the coil, extending in a winding axis direction of the coil, and provided with an accommodating portion with one end opened;
   a mover provided in the accommodating portion so as to be movable in the winding axis direction of the coil and comprising a magnetic element;
   a control valve configured to be controlled by motion of the mover;
   a stator provided at such a position as to face an opening of the accommodating portion and so configured that a protruding portion protruding toward the opening of the accommodating portion and a lateral face portion extending from an outer periphery of the protruding portion in a direction away from the opening of the accommodating portion are integrally formed by a magnetic element;
   a yoke including a fixing hole with an inner peripheral surface facing a part of the lateral face portion of the stator, and
   a joining member configured to be joined to an inner periphery of the yoke at an outer periphery on one side in a winding axis direction of the coil and joined to an outer periphery of the accommodating member at an inner periphery on the other side, the joining member comprising a non-magnetic element.

* * * * *